United States Patent [19]

Yamamoto et al.

[11] Patent Number: 5,214,712
[45] Date of Patent: May 25, 1993

[54] PATTERN INSPECTION SYSTEM FOR INSPECTING DEFECT OF LAND PATTERN FOR THROUGH-HOLE ON PRINTED BOARD

[75] Inventors: Atsuharu Yamamoto, Kawasaki; Yuji Maruyama; Hidehiko Kawakami, both of Tokyo; Hideaki Kawamura, Kawasaki; Masaaki Nakashima, Osaka; Hidemi Takahashi, Zama, all of Japan

[73] Assignee: Matsushita Electric Industrial Co., Ltd., Osaka, Japan

[21] Appl. No.: 757,408

[22] Filed: Sep. 10, 1991

[30] Foreign Application Priority Data

Sep. 11, 1990 [JP] Japan ............................ 2-242120
Feb. 22, 1991 [JP] Japan ............................ 3-028532
Apr. 19, 1991 [JP] Japan ............................ 3-088489
May 8, 1991 [JP] Japan ............................ 3-102401

[51] Int. Cl.$^5$ ............................................ G06K 9/00
[52] U.S. Cl. ................................... 382/8; 358/101; 358/106; 382/49
[58] Field of Search ............... 382/8, 27, 22, 30, 34, 382/14, 41, 49, 55; 358/101, 106, 107

[56] References Cited

U.S. PATENT DOCUMENTS

| | | | |
|---|---|---|---|
| 4,477,926 | 10/1984 | Linger et al. | 382/49 |
| 4,481,664 | 11/1984 | Linger et al. | 382/8 |
| 4,665,554 | 5/1987 | Sternberg | 382/49 |
| 4,893,346 | 1/1990 | Bishop | 382/14 |
| 4,922,308 | 5/1990 | Noguchi et al. | 382/8 |
| 4,975,971 | 12/1990 | Ohnishi | 382/8 |
| 5,027,417 | 6/1991 | Kitakado et al. | 382/8 |
| 5,046,113 | 9/1991 | Hoki | 382/8 |

OTHER PUBLICATIONS

"Machine-vision techniques for inspection of printed wiring boards and thickfilm circuits" by Jorge L. C. Sanz and Anil K. Jain; J. Opt. Soc. Am. A, vol. 3, No. 9; pp. 1465-1482, Sep. 1986.

*Primary Examiner*—Joseph Mancuso
*Attorney, Agent, or Firm*—Lowe, Price, LeBlanc & Becker

[57] ABSTRACT

A pattern inspection system for inspecting a pattern of a land for a through-hole formed in a printed board. In the system there are included a first illumination device for optically illuminating the printed board, a second illumination device for illuminating the printed board with light modulated at a predetermined period and an image pickup responsive to reflection light and transmission light from the printed board due to the first and second illumination devices to photoelectrically convert the printed board into a gray level image. The gray level image is converted into a bi-level image by a bi-level conversion device and then converted into an edge image by an edge detecting device. The edge image is expanded and contracted by predetermined amounts so as to obtain a through-hole image corresponding to the through-hole. A defect detecting device detects a defect of the pattern of the printed board on the basis of the through-hole image and the bi-level image from the bi-level conversion device.

4 Claims, 18 Drawing Sheets

FIG. 1
PRIOR ART
FIG. 1(a)
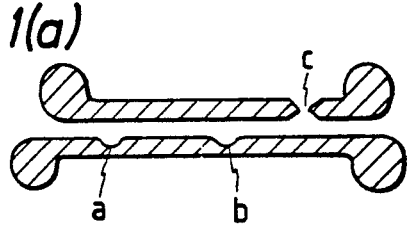
FIG. 1(b)
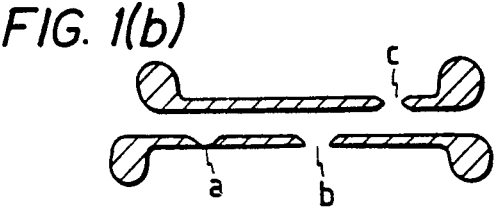
FIG. 1(c)
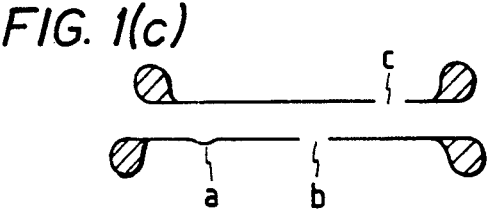
FIG. 1(d)
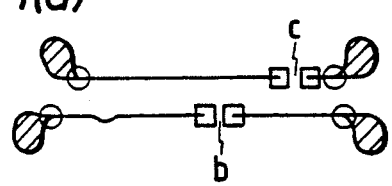
FIG. 1(e)
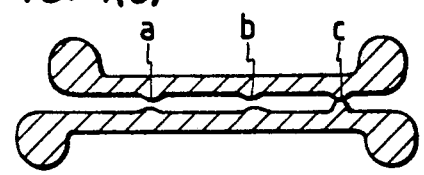
FIG. 1(f)
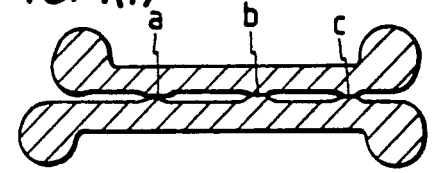
FIG. 1(g)
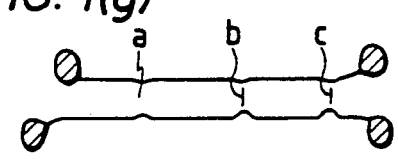
FIG. 1(h)
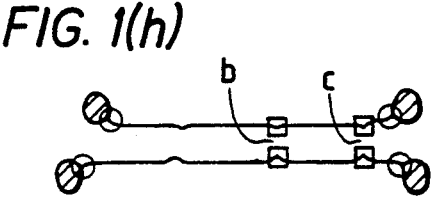

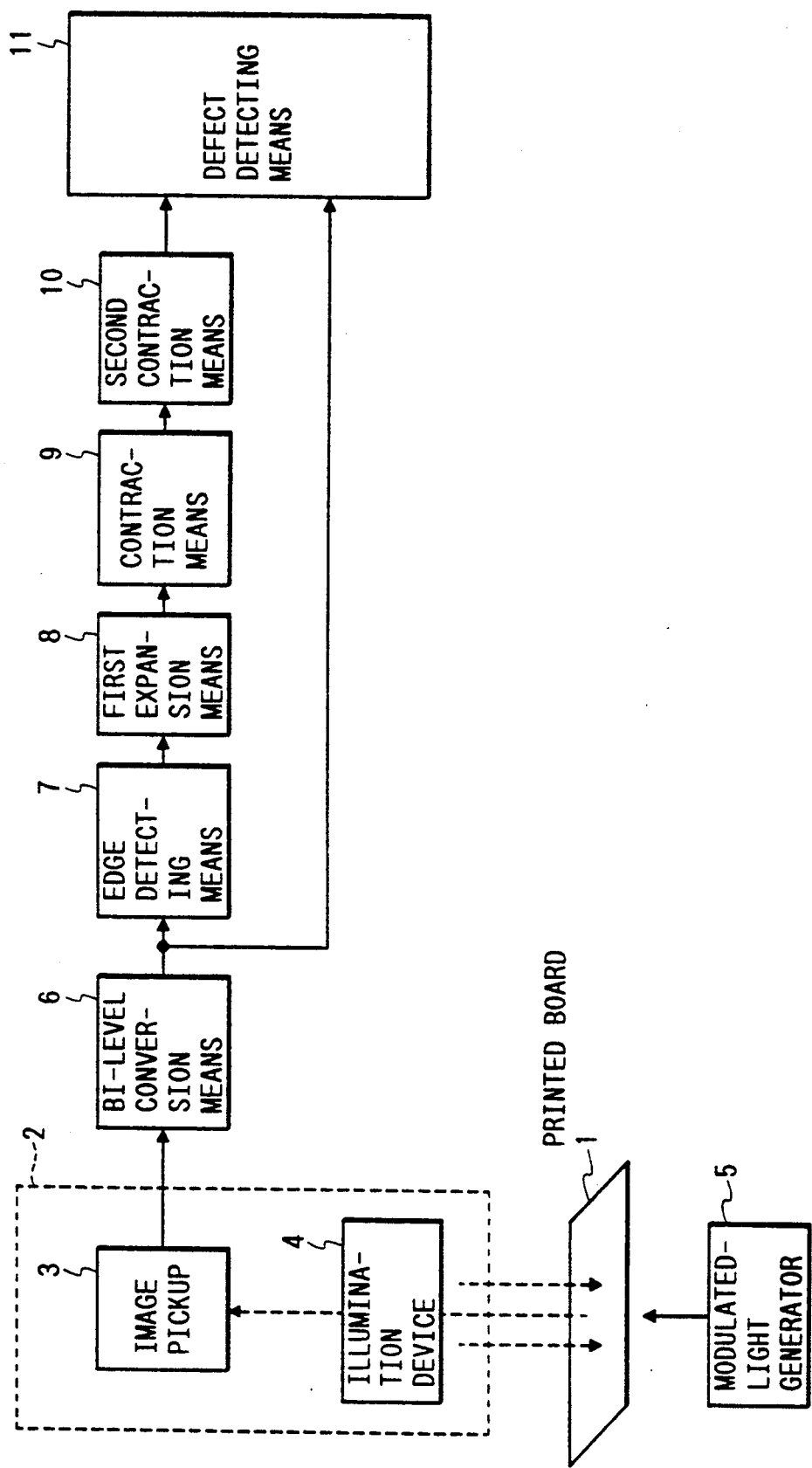

|   |   |   | 5 | 5 | 5 | 5 | 5 |   |   |   |
|---|---|---|---|---|---|---|---|---|---|---|
|   |   | 5 | 4 | 4 | 4 | 4 | 4 | 5 |   |   |
|   | 5 | 4 | 4 | 3 | 3 | 3 | 4 | 4 | 5 |   |
| 5 | 4 | 4 | 3 | 2 | 2 | 2 | 3 | 4 | 4 | 5 |
| 5 | 4 | 3 | 2 | 1 | 1 | 1 | 2 | 3 | 4 | 5 |
| 5 | 4 | 3 | 2 | 1 | 0 | 1 | 2 | 3 | 4 | 5 |
| 5 | 4 | 3 | 2 | 1 | 1 | 1 | 2 | 3 | 4 | 5 |
| 5 | 4 | 4 | 3 | 2 | 2 | 2 | 3 | 4 | 4 | 5 |
|   | 5 | 4 | 4 | 3 | 3 | 3 | 4 | 4 | 5 |   |
|   |   | 5 | 4 | 4 | 4 | 4 | 4 | 5 |   |   |
|   |   |   | 5 | 5 | 5 | 5 | 5 |   |   |   |

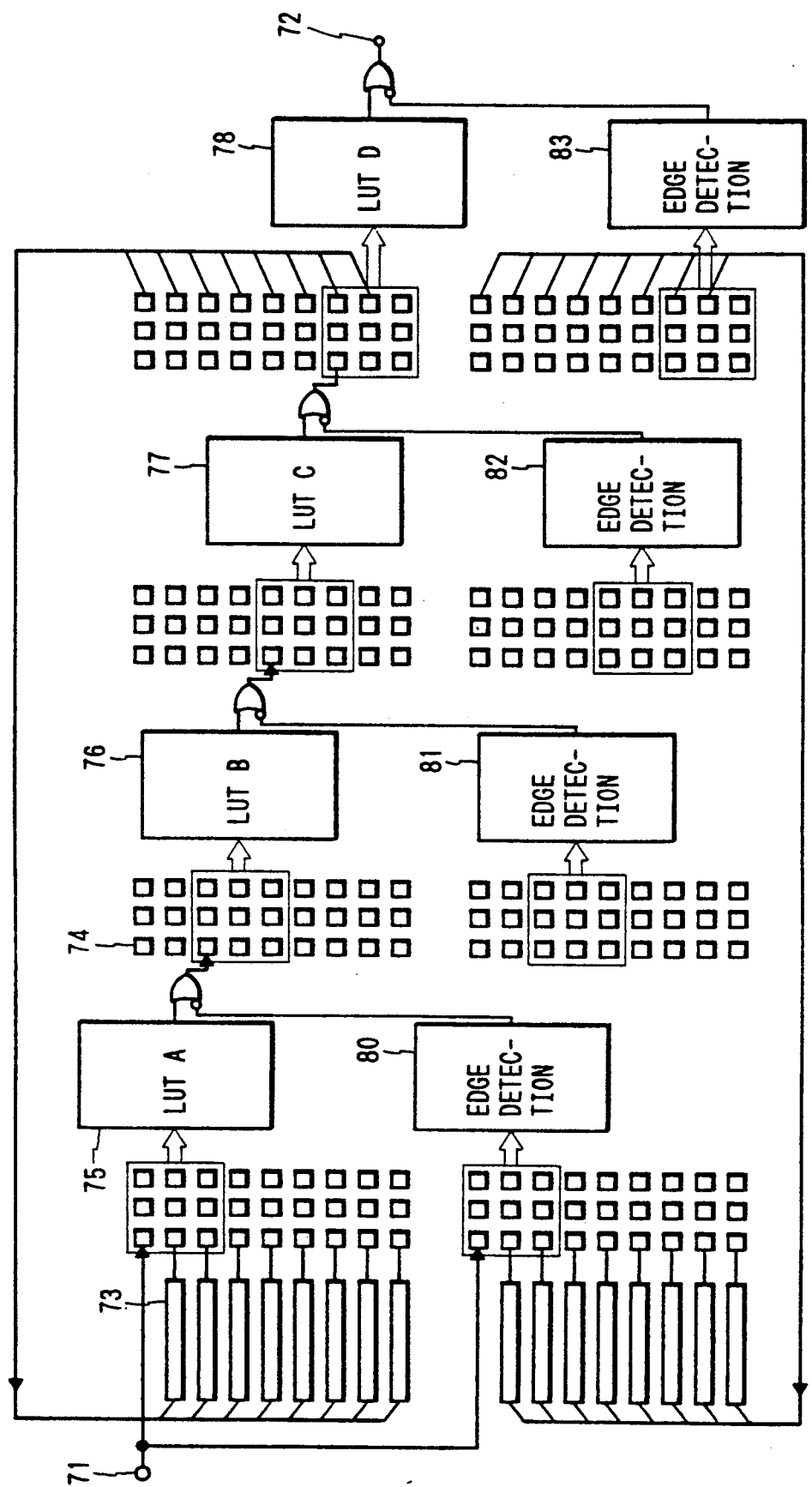

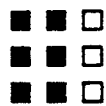 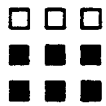 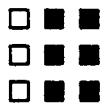 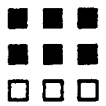
FIG. 9(a)   FIG. 9(b)   FIG. 9(c)   FIG. 9(d)
FIG. 10
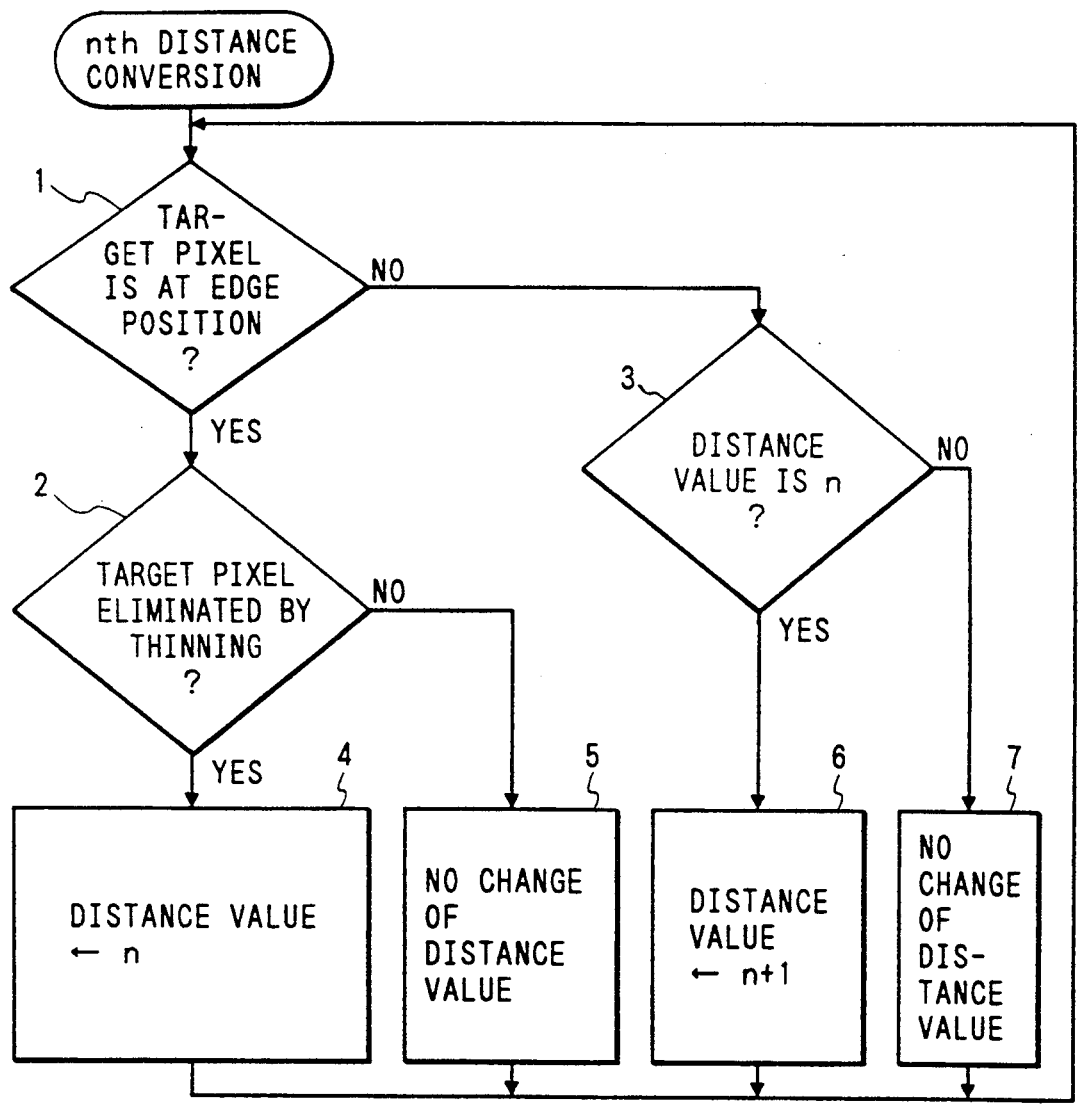

FIG. 15A

| d4 | d3 | d2 |
|----|----|----|
| d5 | d0 | d1 |
| d6 | d7 | d8 |

FIG. 15B

|   |   |   |   |   |   |   |   |   |   |   |
|---|---|---|---|---|---|---|---|---|---|---|
|   |   |   | 5 | 5 | 5 | 5 | 5 |   |   |   |
|   |   | 5 | 5 | 4 | 4 | 4 | 4 | 5 |   |   |
|   | 5 | 4 | 4 | 3 | 3 | 3 | 4 | 4 | 5 |   |
| 5 | 4 | 4 | 3 | 2 | 2 | 2 | 3 | 4 | 4 | 5 |
| 5 | 4 | 3 | 2 | 1 | 1 | 1 | 2 | 3 | 4 | 5 |
| 5 | 4 | 3 | 2 | 1 | 0 | 1 | 2 | 3 | 4 | 5 |
| 5 | 4 | 3 | 2 | 1 | 1 | 1 | 2 | 3 | 4 | 5 |
| 5 | 4 | 4 | 3 | 2 | 2 | 2 | 3 | 4 | 4 | 5 |
|   | 5 | 4 | 4 | 3 | 3 | 3 | 4 | 4 | 5 |   |
|   |   | 5 | 4 | 4 | 4 | 4 | 4 | 5 |   |   |
|   |   |   | 5 | 5 | 5 | 5 | 5 |   |   |   |

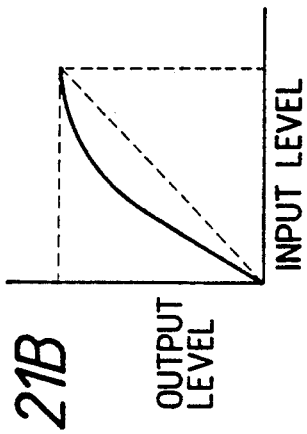
FIG. 21B
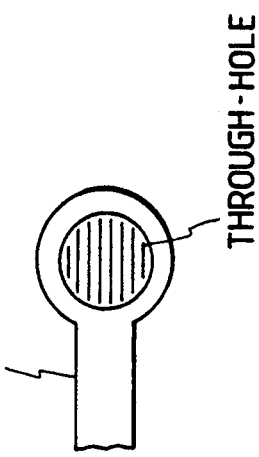
FIG. 21E
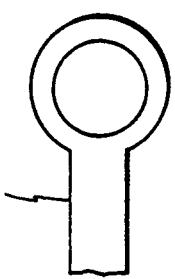
FIG. 21F
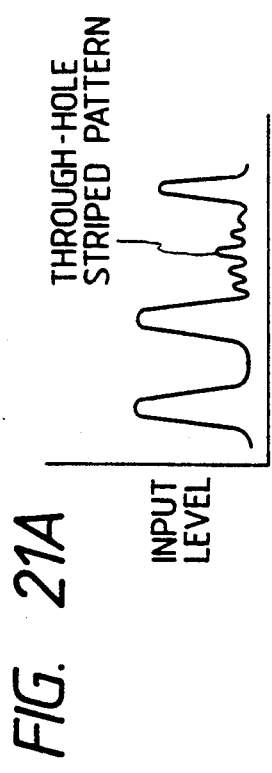
FIG. 21A
FIG. 21C
FIG. 21D

PATTERN INSPECTION SYSTEM FOR INSPECTING DEFECT OF LAND PATTERN FOR THROUGH-HOLE ON PRINTED BOARD

BACKGROUND OF THE INVENTION

The present invention relates to pattern inspection systems, and more particularly to a system for inspecting defects of a pattern of a land portion provided around a through-hole on a printed board.

In order to meet the recent requirement for heightening the mounting density of electronic parts on a printed board, improvement for fining a wiring pattern is being made increasingly. Because difficulty is encountered to keep a high accuracy by the conventional human-eye-based inspection system, it is strongly desired to automatically perform the wiring-pattern inspection. One known approach is a defect detecting system such as is disclosed in "Machine vision techniques for inspection of printed wiring boards and thick-film circuits", J. Opt. Soc. Amer., vol 3, no. 9, pp. 1465-1482, September 1986, written by J. L. C. Sanz and A. K. Jain. The conventional wiring pattern inspection techniques are generally classified mainly into the so-called design-rule system and comparison system. Of these conventional wiring pattern inspection techniques, there is a promising system which is arranged to detect a defect of a wiring pattern by contracting or expanding bi-level image data before performing the thinning process. This system will be described hereinbelow with reference to FIG. 1 where (a) to (d) are illustrations for the procedure of detection of shorting defect and (e) to (h) are illustrations of the procedure of detection of projecting defect. First, in (a) of FIG. 1, a point a represents a non-defective portion, and points b and c respectively denote fatally defective portions accompanying the possibility of line-width abnormality or disconnection. In a first step, a contraction process (erosion process) of the image is performed so that a defect appears at the point b as disconnection as illustrated in (b) of FIG. 1. This contraction process is for scraping the image by one pixel from its circumferential portions to overstate defects of the pattern, thereby causing the defect to appear as the disconnection. A second step is then performed so as to effect the thinning process of the pattern up to one pixel width as shown in (c) of FIG. 1. This thinning process is for repeatedly scraping the image by one pixel from its circumferential portions so that the width of the pattern is fined to cause the pattern to be shown by fine lines (having one pixel width, for example). Thereafter, a third step is for deciding that the 3×3 local areas (indicated by the square boxes) are in the disconnected states as illustrated in (d) of FIG. 1, thereby detecting the disconnections of the points b and c. At this time, the states of the junction points (indicated by the circles) between the terminal portions and the wiring pattern are also detectable. This defect detecting process is effected by scanning 3×3 logical masks and by referring to look-up tables.

Furthermore, a description will be made in terms of defects due to projections. In (e) of FIG. 1, let it be assumed that the points b and c respectively show fatally defective portions accompanying the possibility of the line-width abnormality and short and the point a is a non-defective portion. A first step is executed so as to perform the expansion process by a predetermined size to generate a new connected state at the point b as illustrated in (f) of FIG. 1. Generally, the expansion process is for expanding the image by one pixel toward the outside, thereby causing the point b to enter into the short state. Subsequently, the thinning process is performed as a second step so as to fine the pattern as shown in (g) of FIG. 1. Thereafter, the 3×3 logical mask scanning process is executed as a third step so as to decide that the 3×3 local areas (indicated by the square boxes) the line-fined image are in the connected states as illustrated in (h) of FIG. 1, thereby detecting the shorts at the points b and c. With this process, the states of the junction points (indicated by circles) between the terminal portions and the wiring pattern are also detectable. Here, the technique of the image process such as the thinning process, expansion process and contraction process is generally known as exemplified by "Elements of Image Recognition" published by Ohm Sha.

There is a problem which arises with such a wiring pattern inspection system, however, in that, in the case of inspecting a printed board having through-holes, there is the possibility that the pattern of the land portion (provided around a through-hole and electrically coupled to a wiring pattern on the printed board) is cut so that the under-width of the line (insufficiency of the line-width) of the land portion can be detected in error when the contractions for both the conductive portion and land portion are made under the same condition. This is caused by the fact that the pattern-width references of the conductive portion and the land portion are different from each other.

SUMMARY OF THE INVENTION

It is therefore an object of the present invention to provided a pattern inspection system which is capable of separately and accurately detecting the defects occurring at the land portion and the defects occurring at the conductive portion.

According to the present invention, in a pattern inspection system for inspecting a pattern of a land portion formed around a through-hole of a printed board and electrically coupled to a wiring pattern section, the printed board being arranged to be placed on a movable table so as to be movable in a predetermined direction, there are included: first illumination means for optically illuminating the printed board; second illumination means for illuminating the printed board with light modulated at a predetermined period; and image pickup means responsive to reflection light from the printed board due to the first illumination means and transmission light from the printed board due to the second illumination means to photoelectrically convert the printed board into a gray level (variable-density) image at least corresponding to the through-hole and the land portion. Binary-coding means compares the gray level image from the image pickup means with a predetermined threshold so as to binary-code the gray level image to produce a bi-level image comprising a first portion indicated by "1" and a second portion indicated by "0", edge detecting means detects an edge of the bi-level image to produce an edge image comprising a boundary between the first and second portions, first expansion means expands the edge image from the edge detecting means by a predetermined size so as to produce a first expanded image where a portion corresponding to the through-hole takes the "1" state, contraction means contracts the first expanded image from the first expansion means by a predetermined size to eliminate the edge image other than the through-hole section to produce a contracted image corresponding to only the through-hole, and second expansion means again expands the contracted image from the contraction means by a predetermined size to produce a through-hole image having a size equal to the original size of the through-hole. Also included is defect detecting means for inputting the through-hole image from the second expansion means and the bi-level image from the bi-level conversion (binary-coding) means so as to detect a defect of the land portion on the basis of the inputted images.

BRIEF DESCRIPTION OF THE DRAWINGS

The object and features of the present invention will become more readily apparent from the following detailed description of the preferred embodiments taken in conjunction with the accompanying drawings:

FIGS. 1(a)-(h) are a diagram for describing a conventional wiring pattern inspection system;

FIG. 2 is a block diagram showing an arrangement of a pattern inspection system according to a first embodiment of the present invention;

FIG. 8 is an illustration of a circuit arrangement of a thinning means of the FIG. 2 pattern inspection system;

FIGS. 9(a)-(d) are an illustration of patterns in the thinning process in the first embodiment;

FIG. 10 is a flow chart showing a distance conversion process in the first embodiment;

Figure 13:
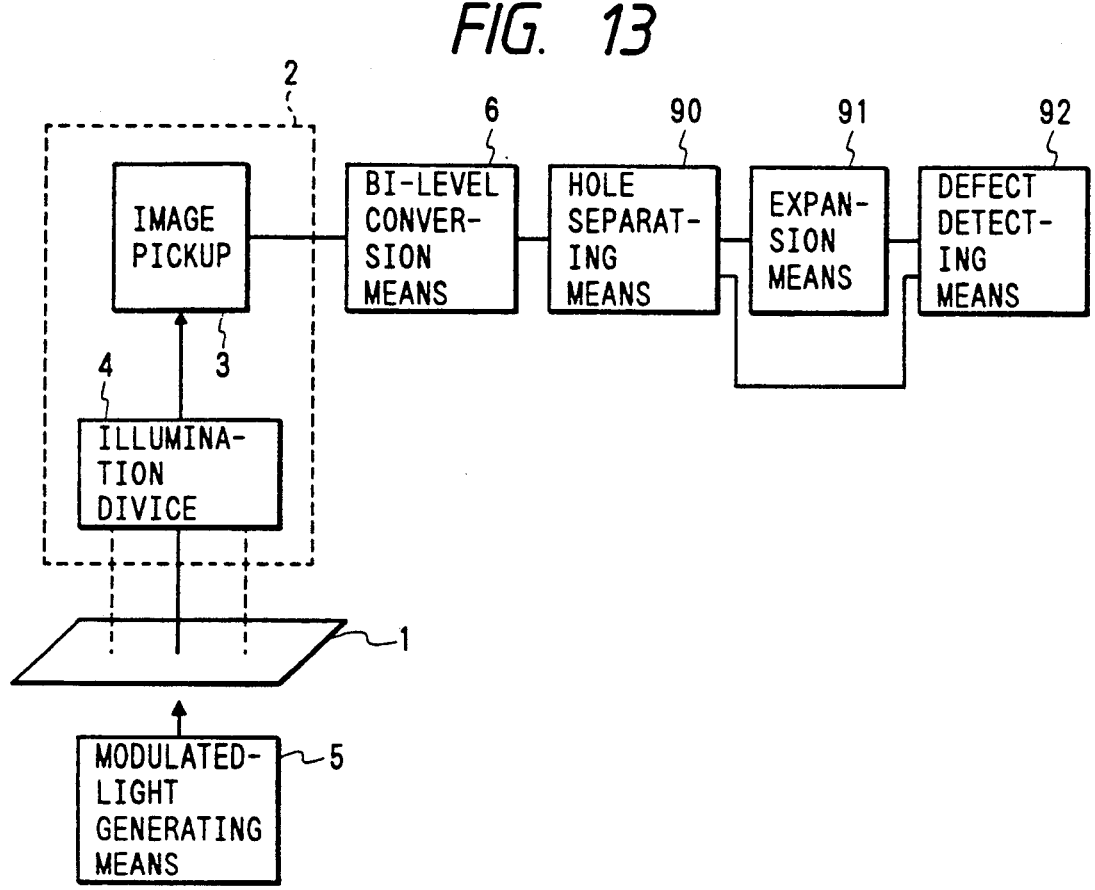
Figure 14:
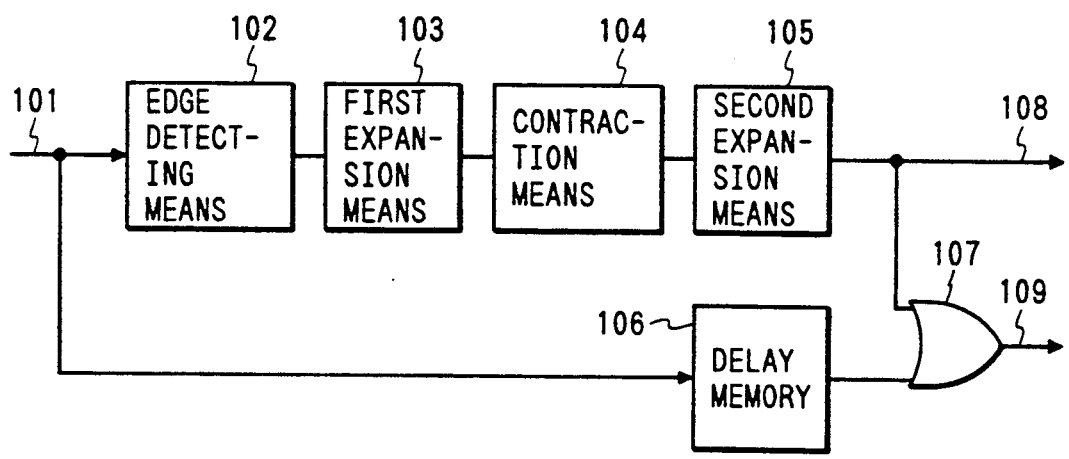
Figure 16:
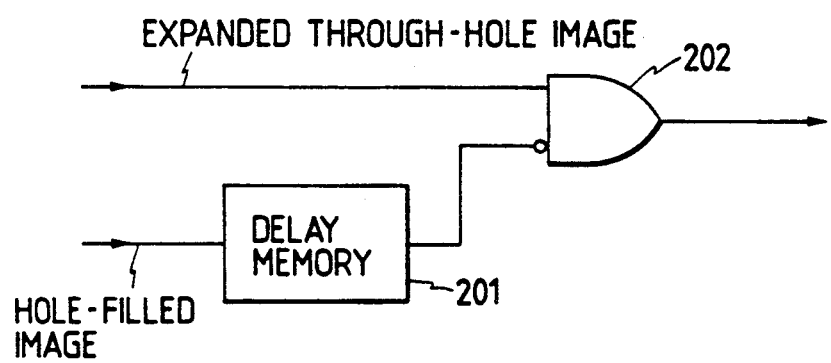
Figure 17:
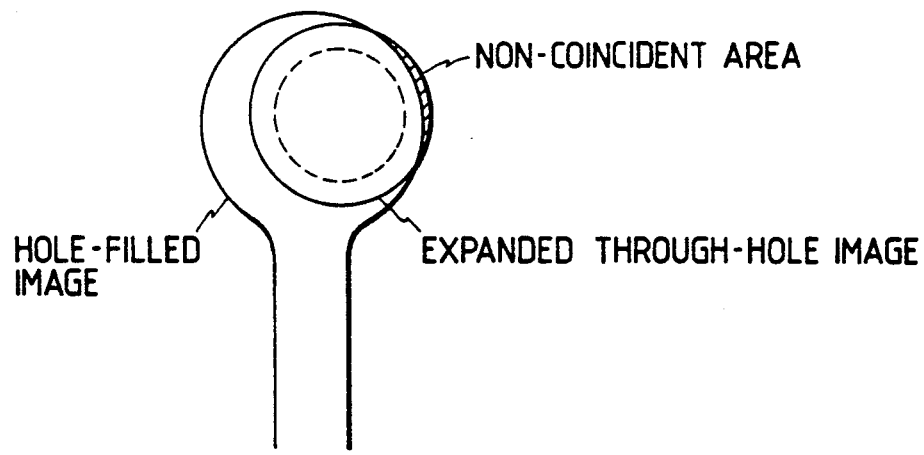
Figure 18:
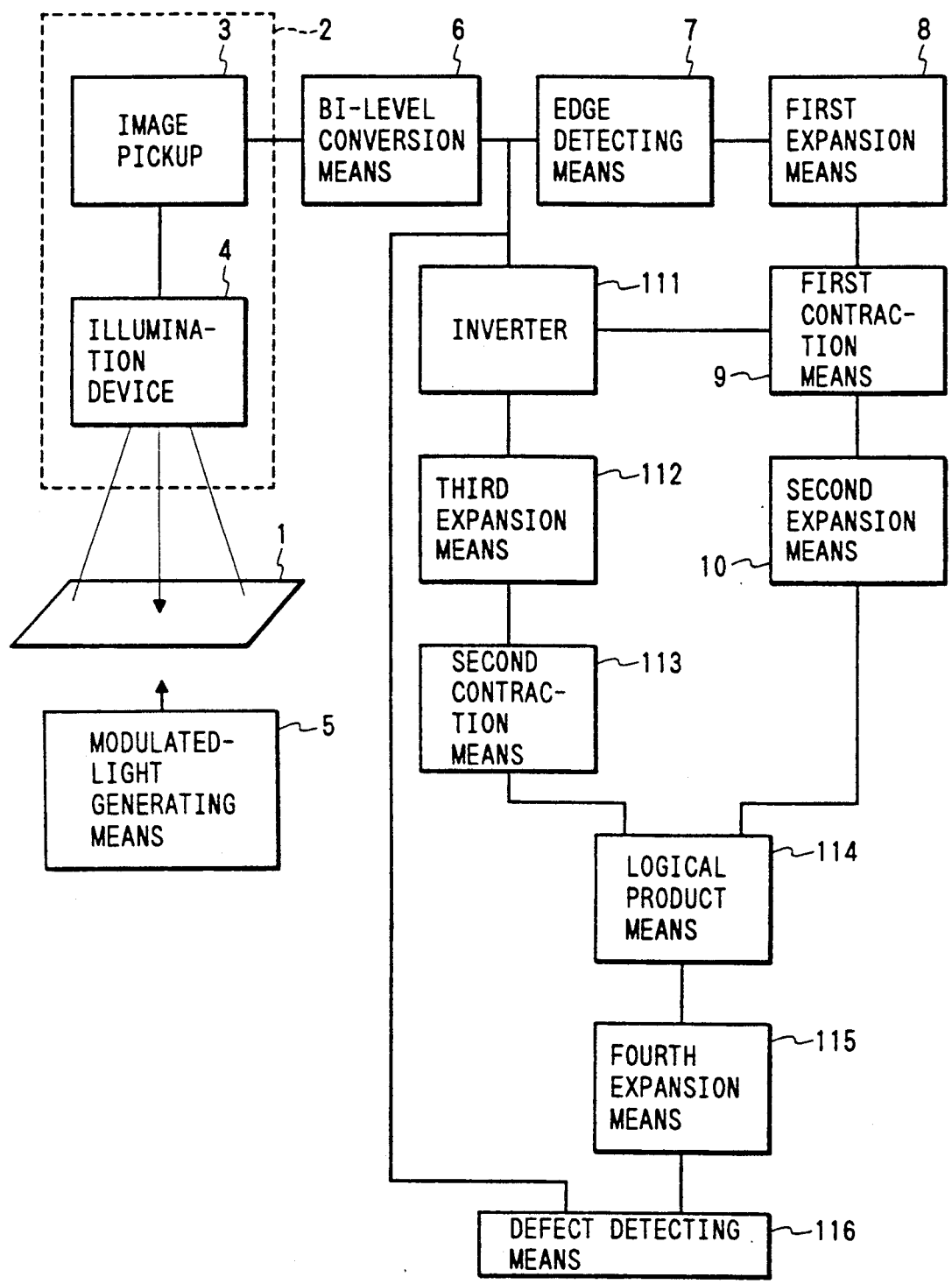
Figure 19:
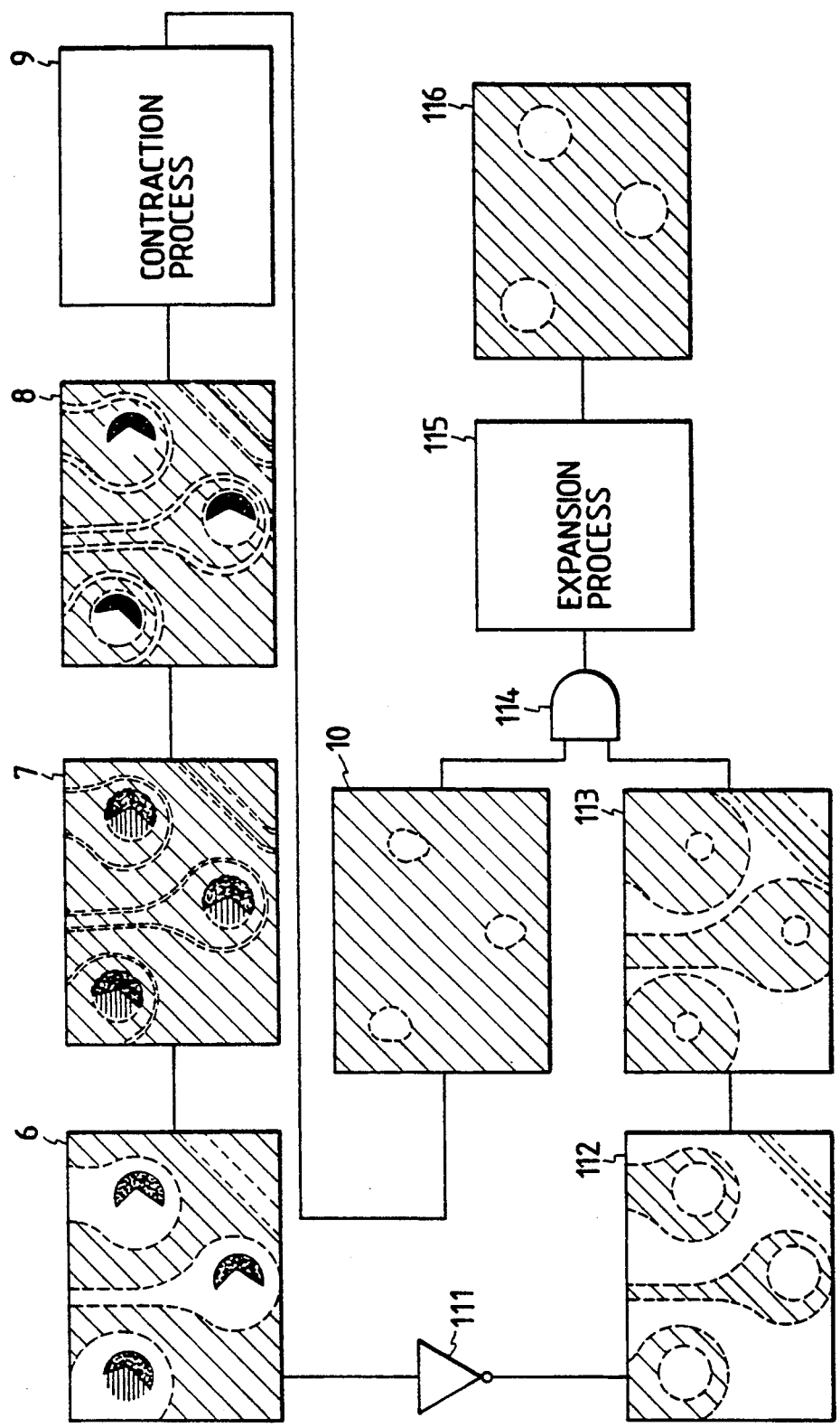
Figure 20:
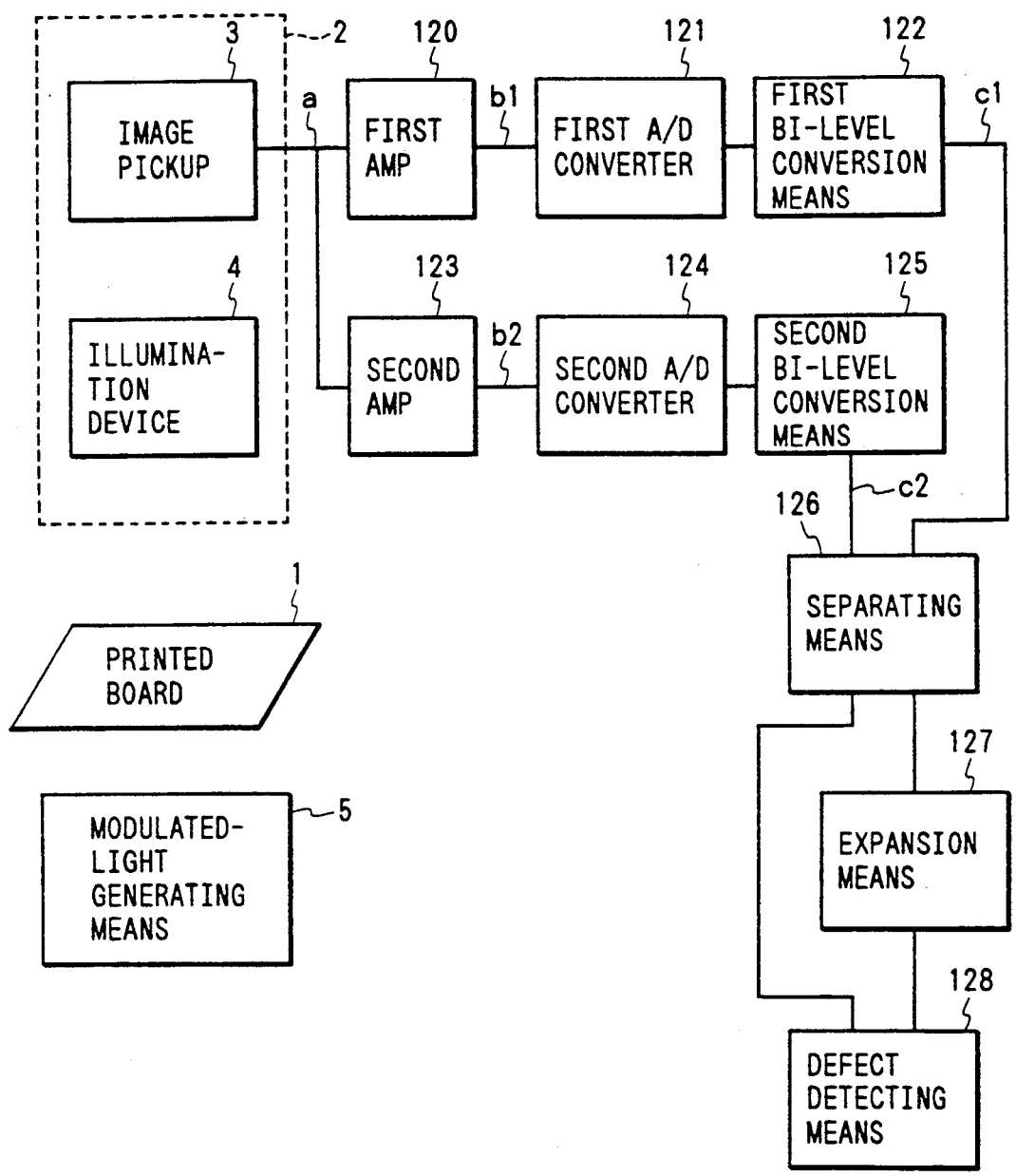
Figure 22:
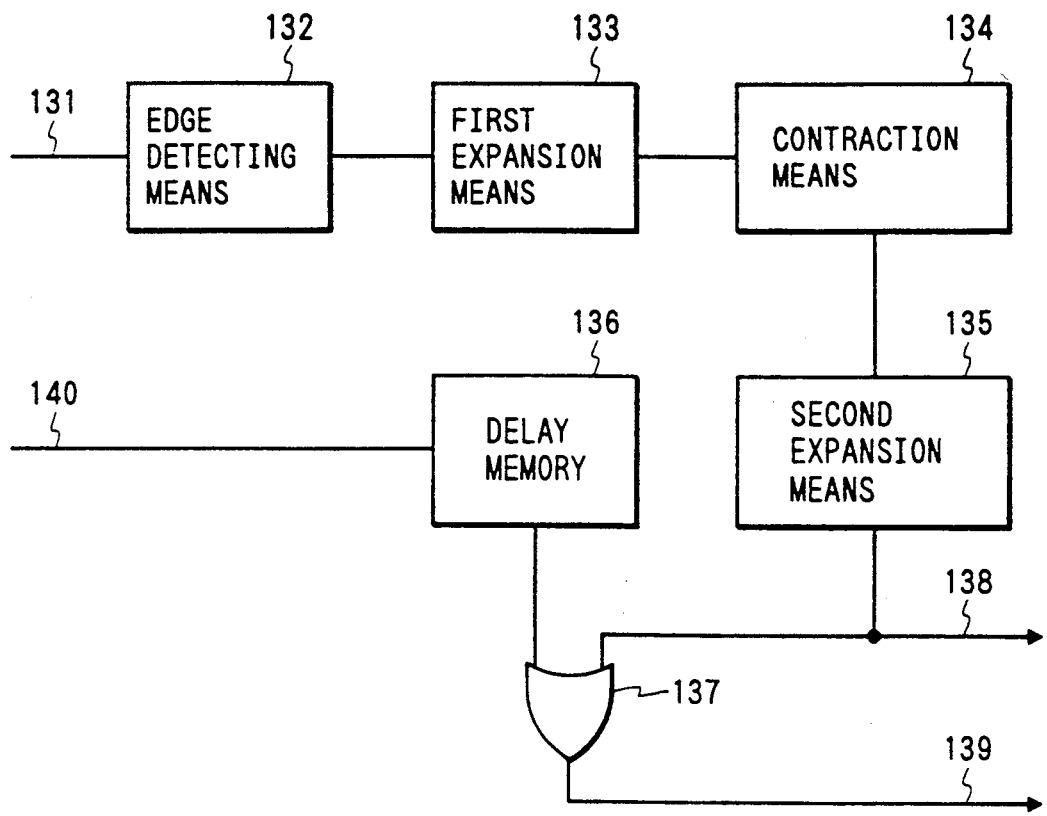
Figure 23:
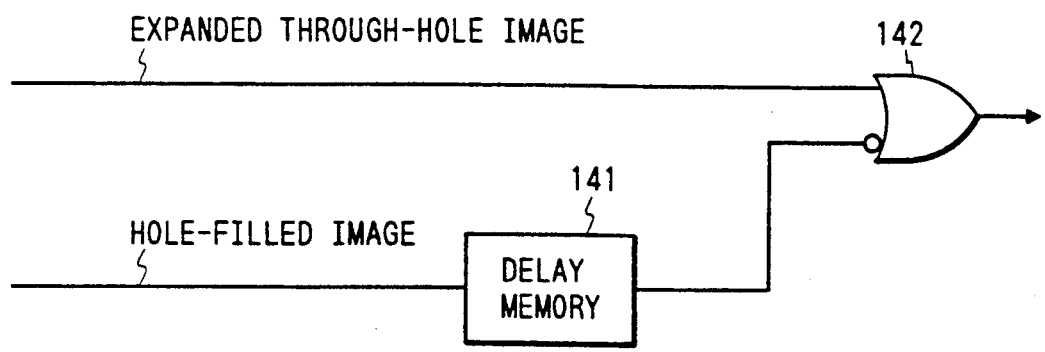

FIGS, 12A and 12B are illustrations of the branch and end detecting patterns in the FIG. 2 pattern inspection system;

FIG. 13 is a block diagram showing an arrangement of a pattern inspection system according to a second embodiment of the present invention;

FIG. 14 is a block diagram showing an arrangement of a hole separating means in the FIG. 13 pattern inspection system;

FIGS. 15A and 15B are illustrations of scanning windows in the second embodiment;

FIG. 16 is a block diagram showing an arrangement of a defect detecting means of the FIG. 13 pattern inspection system;

FIG. 17 is an illustration of an image process to be effected by the defect detecting means of FIG. 13 pattern inspection system;

FIG. 18 is a block diagram showing an arrangement of a pattern inspection system according to a third embodiment of the present invention;

FIG. 19 is an illustration of images processed in the respective means in the FIG. 18 pattern inspection system;

FIG. 20 is a block diagram showing an arrangement of a pattern inspection system according to a fourth embodiment of this invention;

FIGS. 21A to 21F show the states of image signals due to the respective portions in the FIG. 20 pattern inspection system;

FIG. 22 is a block diagram showing an arrangement of a through-hole separating means in the FIG. 20 pattern inspection system; and FIG. 23 is a block diagram showing an arrangement of a defect detecting means of the FIG. 20 pattern inspection system.

DETAILED DESCRIPTION OF THE INVENTION

Referring now to FIG. 2, there is illustrated a wiring-pattern inspection system according to a first embodiment of the present invention. In FIG. 2, illustrated at numeral 1 is an printed board and illustrated at 2 is an image inputting means equipped with a diffusion lighting device 4 such as ring-like light guide and an image pickup device 3 such as a CCD sensor camera to photoelectrically convert the wiring pattern on the printed board 1 into a gray level (multi-density) image. Further, numeral 5 represents a modulated-light generating means for modulating transmission light to generate modulated light, 6 designates a bi-level conversion means for converting the gray level image of the image pickup device 2 into a bi-level image, 7 depicts an edge detecting means for detecting an edge of the pattern of the bi-level image, 8 denotes a first expanding means coupled to the edge detecting means for expanding an edge image, and 9 is a contracting means coupled to the first expanding means 8 for contracting the output image of the first expanding means 8 by a predetermined size (amount). In addition, also included are a second expanding means coupled to the contracting means 9 for expanding the output image of the contracting means 9 by a predetermined size and a defect detecting means 11 coupled to the second expanding means 10 and the bi-level conversion means 6 for detecting defects of a land portion and the like on the printed board 1 on the basis of the output images of both the means 6 and 10.

Operation of the wiring-pattern inspection system thus arranged will be described hereinbelow with reference to FIG. 2. First, the wiring pattern on the printed board 1 is illuminated from the top by means of the diffusion lighting device 4 so that the reflected light therefrom is inputted as a gray level image to the image pickup device 3 of the image inputting means 2. At the same time, the printed board 1 is illuminated from the lower side by light modulated with a predetermined period by means of the modulated-light generating means 5 so that the light passing through the through-holes of the printed board 1 is incident on the image pickup device 3 of the image inputting means 2. Here, in this embodiment, a one-dimensional CCD sensor camera is used as the image pickup device 3. The modulated-light generating means 2 is arranged so as to modulate the amplitude of the transmission light in synchronism with the horizontal synchronizing signal of the one-dimensional CCD sensor camera 3.

The printed board 1 is placed on a movable table, not shown, so as to be scanned by the CCD sensor camera 3. The gray level image to be obtained by the CCD sensor camera 3 is an image whose image signal level is modulated at every pixel (picture element) in the secondary scanning direction (in the moving direction of the movable table) in the through-hole area. The bi-level conversion means 6 compares the gray level image from the image pickup device 3 with a predetermined threshold so as to obtain a bi-level image where the wiring pattern portion of the printed board 1 is indicated as "1" and the base portion is indicated as "0". With this bi-level conversion operation, the bi-level image corresponding to the through-hole area takes a striped image where the image signal level "1" alternates with the image signal level "0" in the secondary scanning direction. The edge detecting means 7 converts the bi-level image from the bi-level conversion means 6 into an edge image (an outline image) and the first expanding means 8 enlarges the edge image therefrom by an amount corresponding to predetermined pixels so as to smear away the through-hole area. In this embodiment, the through-hole area is arranged such that the edges are successively arranged at an interval corresponding to one pixel, and therefore the smearing-away of the through-hole area can be achieved by the expansion by the amount corresponding to one pixel. The contracting means 9 contracts the bi-level image from the first expanding means 8 by a predetermined size so as to remove the edge image except for the through-hole area. Since the one-pixel expansion of the edges is made by the first expanding means 8 so as to obtain a three-pixel width, if the contraction of an amount corresponding to two or more pixels is made from both sides of the pattern (for example), the outlines of the section other than the through-hole area can be eliminated to separate the through-hole area. Further, the second expanding means 10 expands the bi-level image from the contracting means 9 by a predetermined size so as to restore the through-hole size. For detecting the defect of the printed board 1, the defect detecting means 11 separates the land portion from the conductive portion by using the bi-level image from the bi-level conversion means 6 and the through-hole image from the second expanding means 10.

Figure 3:
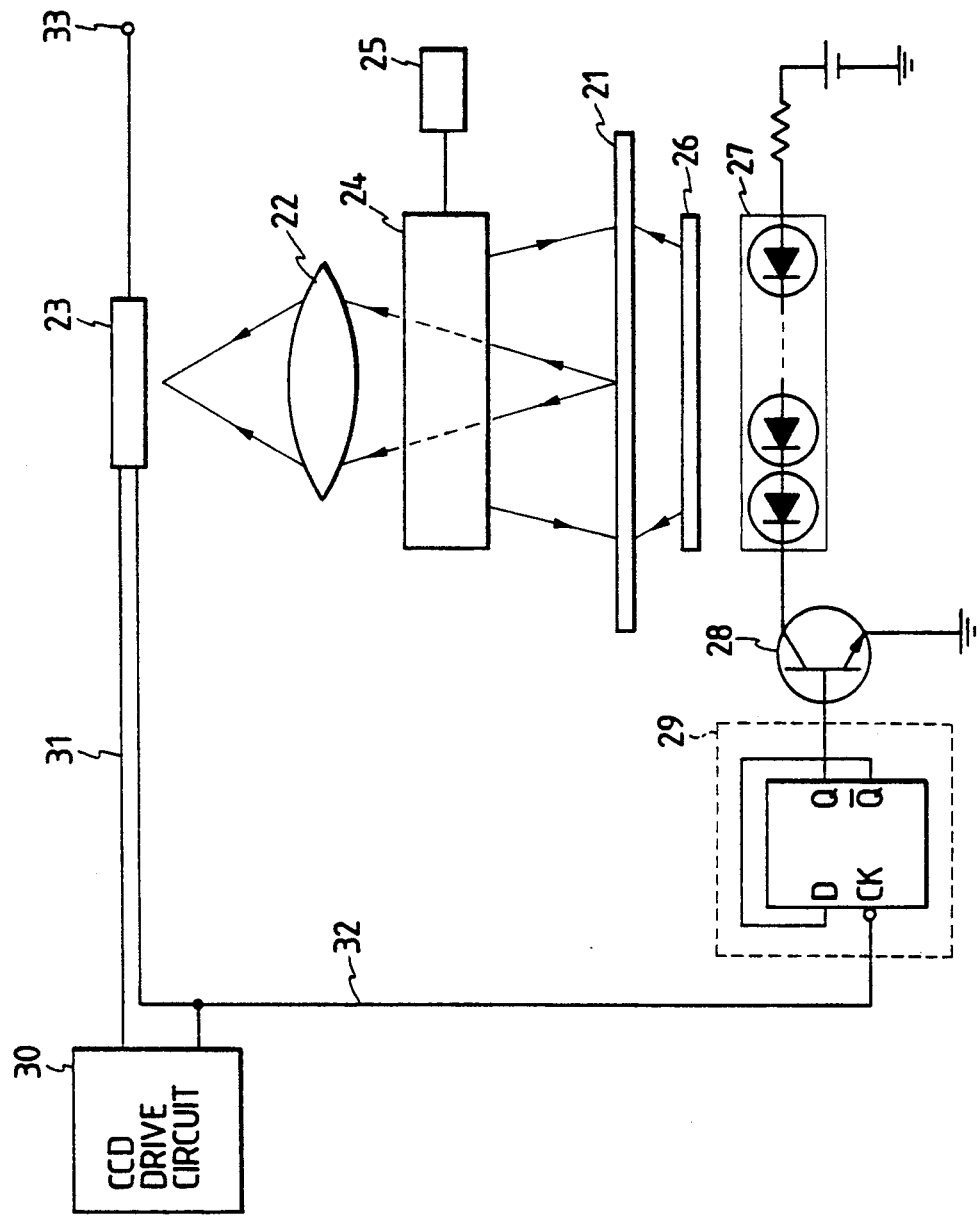
FIG. 3 shows an arrangement of an image inputting means and a modulated-light generating means in the FIG. 2 pattern inspection system.

A detailed description will be made hereinbelow in terms of the operation of each section. FIG. 3 shows arrangements of the image inputting means 2 and the modulated-light generating means 5. In FIG. 3, numeral 21 represents a printed board, 22 designates an optical lens, 23 depicts a CCD line sensor, 24 denotes a ring-like light guide, 25 is a halogen lamp, 26 represents a diffusion plate, 27 is a line light source such as a LED allay, and 28 designates a driver for the LEDs, 29 depicts a frequency divider such as a half-frequency divider. Further, numerals 30 represents a CCD drive circuit, 31 depicts a pixel clock (which will be referred hereinafter to as a CLK) of the CCD sensor 23, 32 denotes a horizontal synchronizing clock (which will be referred hereinafter to as a SYNC) of the CCD sensor 23, and 33 indicates an output terminal for outputting a gray level image from the CCD sensor 23.

In operation, the illumination light emitted from the halogen lamp 25 is diffused by means of the wing-like light guide 24 so as to diffusively illuminate the printing board 21. At the same time, the illumination light emitted from the LED array 27 is diffused by the diffusion plate 26 so as to transmissibly illuminate a through-hole of the printed board 21. The reflected light due to the ring-like light guide 24 illumination and the transmitted light due to the LED array 27 illumination are respectively imaged through the optical lens 22 on the CCD sensor 23. The CCD sensor 23 is responsive to both the CLK 31 and SYNC 32 from the CCD drive circuit 30 so as to output a gray level image through the output terminal 33. At this time, the SYNC 32 is divided to ½ by means of the half-frequency divider 29 so as to be inputted to the LED driver 28 whereby the LED array 27 flashes at every one period in synchronism with the SYNC 32.

Figure 4A:
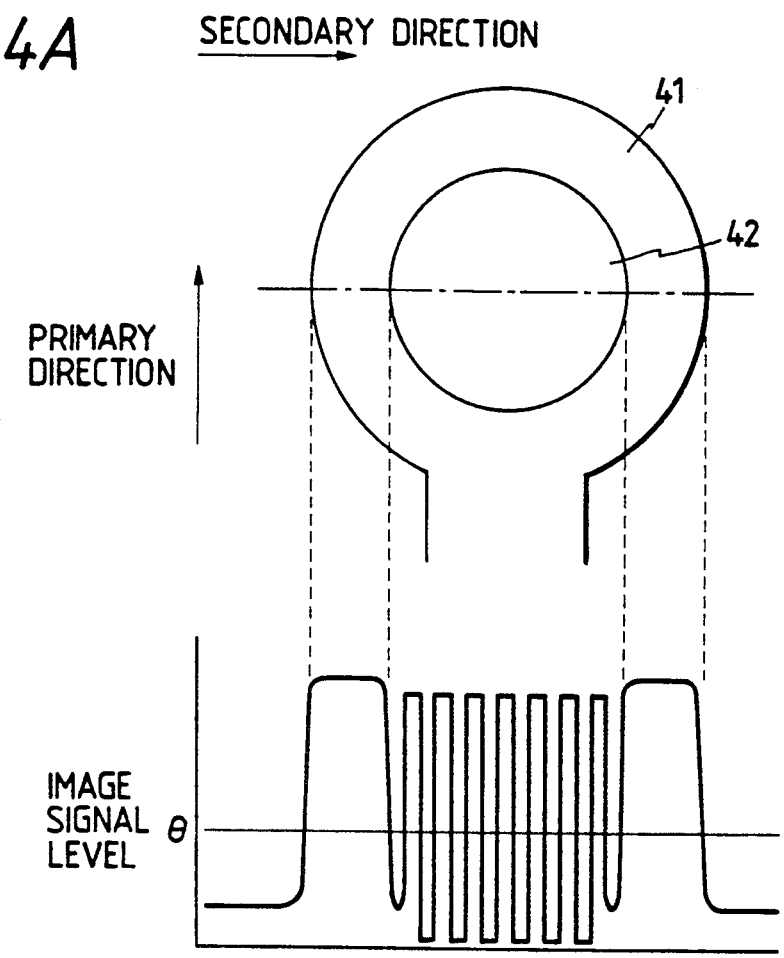
FIGS. 4A and 4B are illustrations of bi-level images produced by a bi-level conversion means to be used in the FIG. 2 pattern inspection system.
Figure 4B:
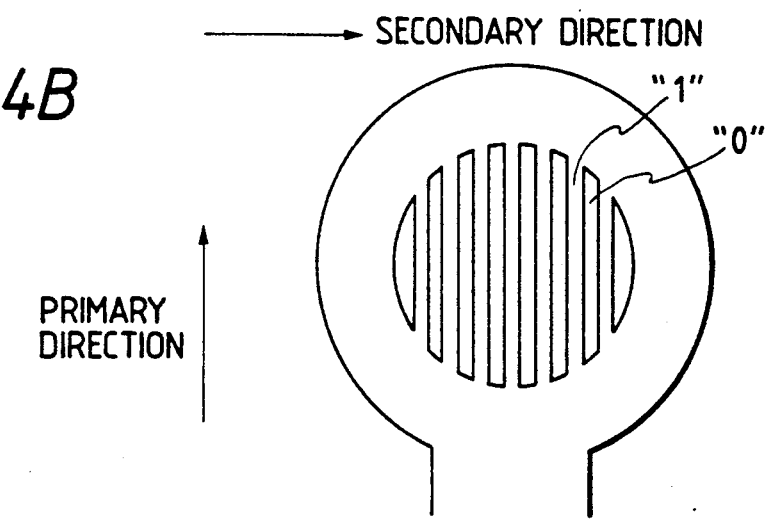

FIGS. 4A and 4B are bi-level images due to the bi-level conversion means 6, FIG. 4A showing variation of the image signal level in the through-hole area in the secondary scanning direction. In FIG. 4A, numeral 41 indicates a conductive portion and 42 represents a through-hole area. The image signal level varies in the secondary scanning direction at an interval corresponding to one line in the through-hole area. Thus, if bi-level conversion it with a threshold $\theta$, there is obtained a bi-level image of the through-hole area 42 where "1" alternates with "0" in the secondary scanning direction as illustrated in FIG. 4B.

Figures 5, 6:
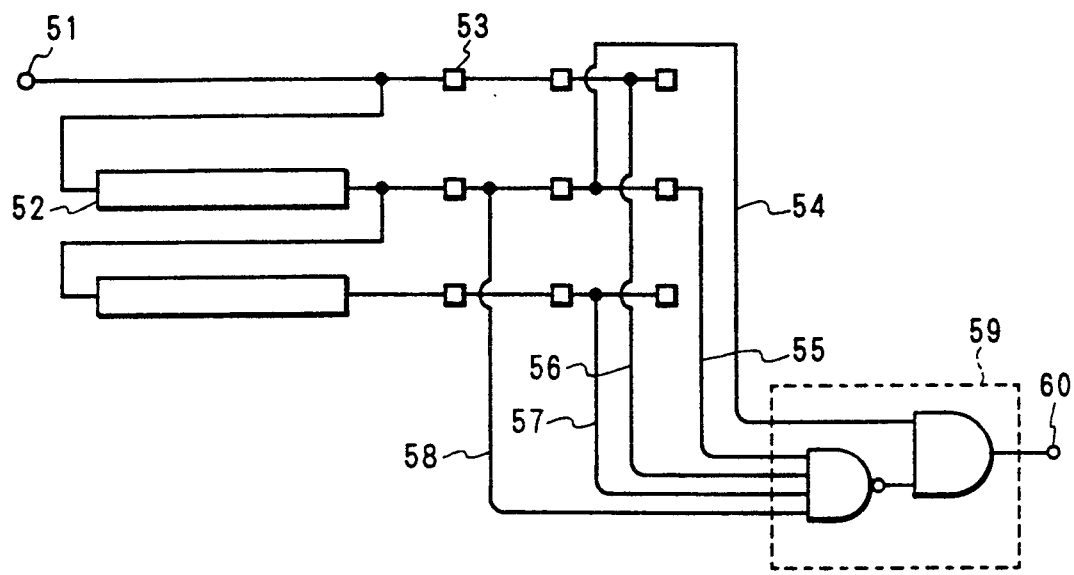
FIG. 5 is a circuit diagram showing an arrangement of an edge detecting means to be used in the FIG. 2 pattern inspection system.
FIG. 6 shows a logical mask to be used in a expansion means and a contraction means of the FIG. 2 pattern inspection system.

Secondly, a description will be made hereinbelow with reference to FIG. 5 in terms of the image signal process due to the edge detecting means 7, FIG. 5 showing a circuit arrangement of the edge detecting means 7. In FIG. 5, numeral 51 represents an input terminal which is responsive to the bi-level data from the bi-level conversion means 6, 52 designates a line memory for delaying the bi-level data by one line, 59 depicts an edge detecting circuit, and 60 is an output terminal for outputting the edge signal produced by the edge detecting circuit 59. FIG. 4 illustrates a general arrangement of a 3×3 window scanning circuit comprising the line memories 52 and shift registers, which is arranged to scan the image with the data being shifted by one pixel in synchronism with the pixel clock CLK of a CCD sensor, not shown. The edge of the bi-level image is detectable by the edge detecting circuit 59 on the basis of the target pixel value 54 and the four-adjacent pixel values 55 to 58 thereof.

Further, a detailed description will be made hereinbelow with reference to FIG. 6 in terms of the operations of the first expanding means 8, contracting means 9 and second expanding means 10. FIG. 6 shows a m×m logic mask for the expanding or contracting process. As well as the case in FIG. 5, this logic mask is composed of line memories and shift registers and arranged to perform a predetermined logic calculation with the window being shifted by one pixel in synchronism with the pixel clock. The expanding processes due to the first and second expanding means 8 and 10 can be realized with the logical sum (OR) of a predetermined pixel on the logic mask as illustrated in FIG. 6. In the case of performing the expanding process by a size k (k≦m), the logical sum of the pixels that the number in the logic mask is below k is calculated. Further, in the contracting process due to the contracting means 9, the logical product (AND) of the pixels that the number in the mask is equal to and greater than k is calculated. The edge image to be inputted to the edge detecting means 7 is arranged such that at the through-hole area the edges of the transmission light image are successively arranged at an interval of one pixel, and the through-hole area is smeared away by "1" with the expansion being made by size 1 by means of the first expanding means 8. Subsequently, the contraction is made by an amount corresponding to the size k' (k'≦2) or more by means of the contracting means 109 whereby except for the through hole the edges are erased so as to separate the through-hole area. Since the output image of the contracting means 9 is reduced in size by (k'−1) as compared with the original through-hole, the through-hole image having the original dimension can be obtained when the size (k'−1) expansion is made by the second expanding means 10. Thereafter, the defect detecting means 11 inputs the bi-level of the original bi-level image, the period-pattern-removed image being inputted to the thinning means 65. In the thinning means 65, the process for fining the pattern by one pixel is repeatedly performed predetermined times. FIG. 8 shows a detailed circuit arrangement for performing the thinning process n times. In FIG. 8 numeral 71 is an input terminal for inputting the image obtained by performing the thinning process (n−1) times, 72 represents an output terminal for outputting the image obtained by performing the thinning process n times, 73 designates line memories, 74 depicts shift registers, 75 to 78 denote look-up tables (which will be referred hereinafter to as LUTs), and 80 to 83 are edge detecting circuits. The first thinning process is effected such that the pixels are removed from four directions, i.e., from the upper and lower sides and the left and right sides and the removal decision of the target position is made with reference to the LUTs A to D (75 to 78) in accordance with the bit pattern of the 3×3 window. For example, as illustrated in (a) to (d) of FIG. 9, the thinning process is performed such that the removing positions are distributed to the LUTs A to D whereby the pattern can be fined in the state that the connection is kept as it is without elimination of the pattern having a plurality of pixel widths. The thinning process is well known and therefore the detailed description thereof will be omitted for brevity.

The edge detecting circuits 80 to 83 are for selectively determining one of 4-adjacent (4-neighbor) edge position and 8-image from the bi-level conversion means 6 and the through-hole image from the second expanding means 10 for the defect detection.

Figure 7:
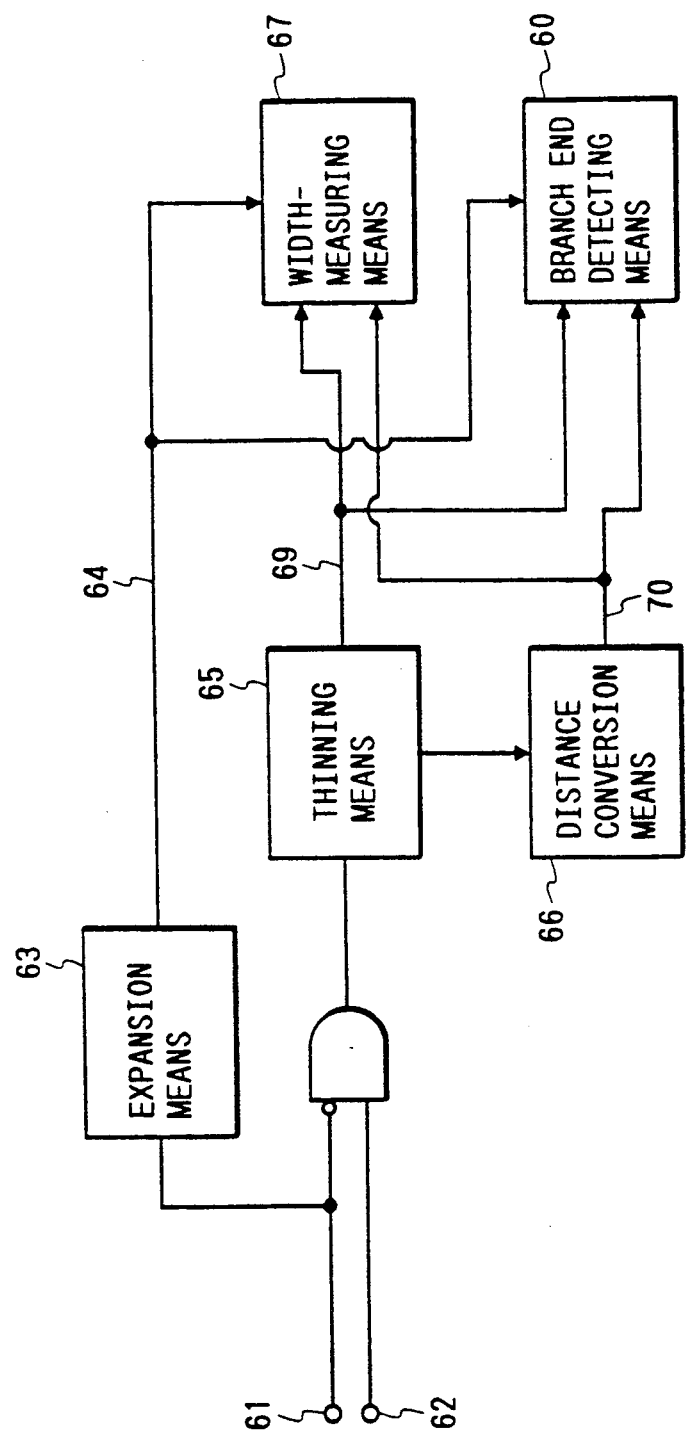
FIG. 7 is a block diagram showing an arrangement of a defect detecting means of the FIG. 2 pattern inspection system.

Operation of the defect detecting means 11 will be described hereinbelow with reference to FIG. 7 showing an arrangement of the defect detecting means 11. In FIG. 7, numeral 61 represents an input terminal for receiving the through-hole image from the second expanding means 10, 62 designates another input terminal for receiving the bi-level image from the bi-level conversion means 6, 63 depicts an expanding means for expanding the through-hole image by a predetermined size, 65 denotes a thinning means for scraping the pattern from the background side by one pixel, 66 indicates a distance conversion means for, simultaneously with the thinning process, giving distance values with respect to the outside (background side) to the pixels making up the wiring pattern, 67 is a width measuring means for measuring the width of the pattern along the line-fined pattern with reference to the distance values given by the distance conversion means 66, and 68 indicates a branch and end detecting means for detecting a branching portion and end point of the line-fined pattern.

In operation, the through-hole image from the input terminal 61 is inverted, and the logical product of the inverted through-hole image and the bi-level image from the input terminal 62 is then taken so as to remove the period pattern of the through-hole area adjacent (8-neighbor) edge position in the pattern as the position of the pixel to be removed due to the thinning process, and the output signal of the LUT is gated by the edge detection signal therefrom. In the first to nth thinning processes, the edges to be detected are set to be 4-adjacent edge, 8-adjacent edge, 4-adjacent edge, 8-adjacent edge, ..., in order, for example. Under the conditions that the target pixel is taken as d0 and 8-adjacent pixels are taken as d1 to d8, the detecting circuit performs the following combinational logical process:

in the case of the 4-adjacent edge $$d0 \cdot \overline{(d1 \cdot d2 \cdot d3 \cdot d4 \cdot d5 \cdot d6 \cdot d7 \cdot d8)}; \text{ and}$$

in the case of the 8-adjacent edge $$d0 \cdot \overline{(d1 \cdot d3 \cdot d5 \cdot d7)}$$

where · represents the logical products and the top bar denotes the negation.

Further, a description will be made hereinbelow with reference to FIG. 10 in terms of the operation of the distance conversion means 66. FIG. 10 is a flow chart for describing the distance conversion procedure. Here, the distance conversion means 66 is arranged to, before the first thinning process, give a distance value "1" to the position "1" and a distance value "0" to the position "0" in the process for giving the repetition numbers for the thinning to the input image simultaneously with the thinning process. In FIG. 10, a step 1 is first executed in order to check whether the target pixel is in the edge position. If the answer of the step 1 is affirmative, a step 2 follows to check whether the target pixel is removed by the n-time thinning process. If the answer of the step 2 is affirmative, a step 4 is executed in order to give the distance value n to the target position. If the answer of the step 2 is negative, operation goes to a step 5 where the distance value is not changed. On the other hand, if the answer of the step 1 is negative, operation goes to a step 3 to check whether the distance value of the target position is n. If so, a step 6 is executed to give a distance value (n+1). If not, operation goes to a step 7 where the distance value is not changed. With this procedure, the repetition numbers 1 to n+1 for the light-fining are given to the input image so as to produce the distance image 70 which is inputted to the width-measuring means 67 and the branch and end detecting means 68 together with the line-fined image 69 outputted from the thinning means 65.

Figure 11:
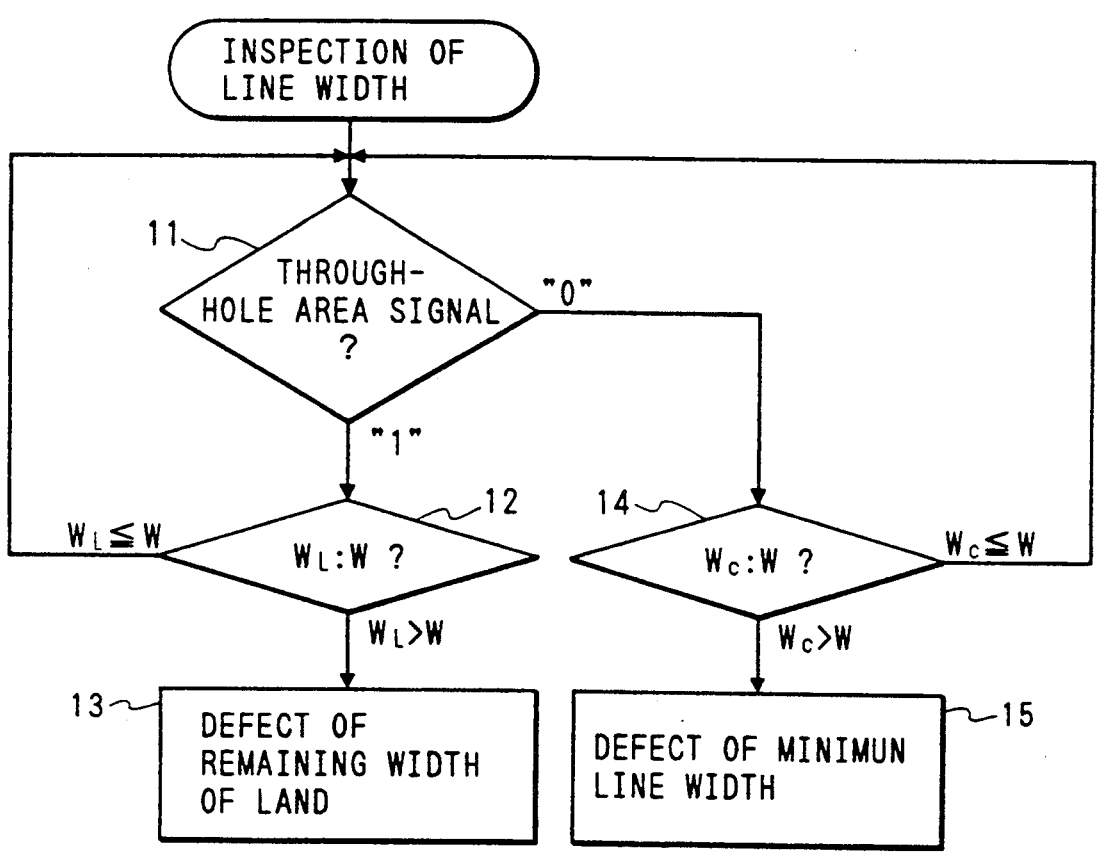
FIG. 11 is a flow chart showing a line-width inspecting process in the FIG. 2 pattern inspection system.

A further description will be made hereinbelow in terms of the operation of the width-measuring means 67. The width-measuring means 67 measures the line width of the target position along the line-fined image with reference to the distance image 70 to detect the position having the line width different from the line width on design. When the target position is "1" in the line-fined image, the line-width measurement value M is determined in accordance with the following equation.

$$W = \left( D0 + \left[ \frac{1}{8} \sum_{i=1}^{8} Di + 0.5 \right] \right) \times \mu \quad (1)$$

Where $\mu$ represents the image pickup resolution, D0 designates the distance value of the target position, Di (D1 to D8) denotes the 8-adjacent distance values. FIG. 11 is a flow chart for describing the procedure of the line-width inspection in which the comparison between the width $W_L$ of the remaining land and the line width Wc on design is made using the measurement value W. In FIG. 11, a step 11 is first executed in order to check whether the through-hole area signal is "1". If it is "1", in a step 12 the measurement value W is compared with the width $W_L$ of the remaining land. If $W_L > W$, a step 13 is executed to determine the abnormality of the width of the remaining land. If not, the operational flow returns to the step 11. On the other hand, if in the step 11 the through-hole area signal is "0", a step 14 follows to compare the minimum line width Wc on design with the measurement value W. If $Wc > W$, a step 15 follows to determine the abnormality of the minimum line width. If not the operational flow returns to the step 11. With this procedure, the through-hole area signal indicates the area where the through-hole image from the input terminal 61 is expanded by a predetermined size by means of the expanding means 63

Figure 12A:
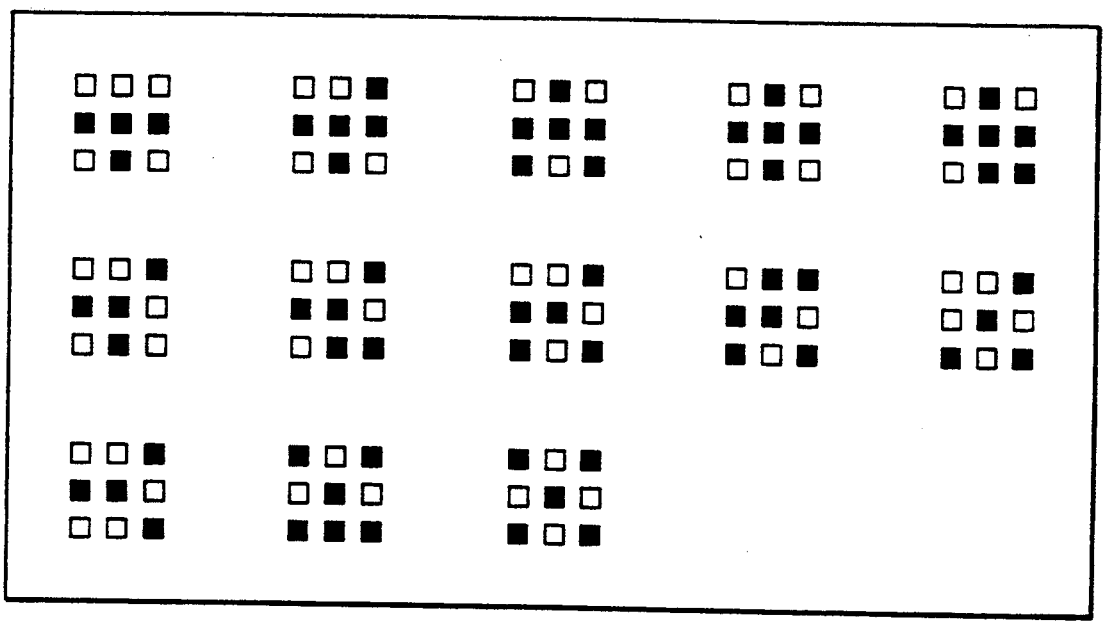
Figure 12B:
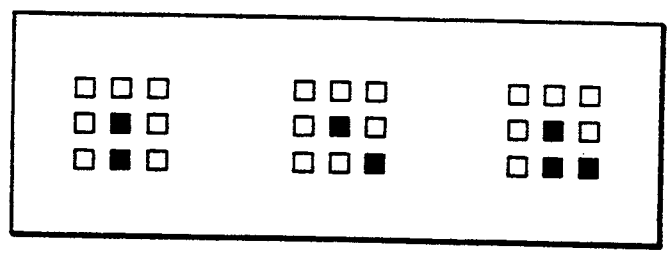

A description will be made hereinbelow in terms of the operation of the branch and end detecting means 68. In the branch and end detecting process, the line-fined image is scanned with the 3×3 window so as to detect features on figure such as end portions and brached portions of the pattern to detect the disconnections and shorts with reference to the distance value of the corresponding position of the distance image. FIG. 12A is an illustration of a pattern indicative of a short and FIG. 12B is an illustration of a pattern indicative of an end point. The measurement value W is obtained with reference to the distance value of the corresponding position of the distance image in accordance with the procedure similar to the equation (1) to compare the minimum pad size Wp on design with the measurement value W. If $Wp > W$, disconnection is determined. In FIGS. 12A and 12B, the illustrations of the mirror symmetry and the rotation symmetry of the 3×3 pattern are omitted. Here, in the case that disconnection occurs in the area in which the through-hole area signal is "1", the occurrence of the cut-off of the land is determined.

Although in the above description the striped pattern of the through-hole area in the inputted bi-level image is eliminated with the through-hole image, it is also appropriate that the through-hole image and the bi-level image are overlapped with each other to convert it into a pattern similar to the pattern before the manufacturing of the through hole, thereby performing the defect detection.

Secondly, a description will be made hereinbelow in terms of a second embodiment of the present invention. FIG. 13 is a block diagram showing an arrangement of a pattern inspection system according to this embodiment where parts corresponding to those in FIG. 2 showing the first embodiment are marked with the same numerals. In FIG. 13, illustrated at numeral 2 is an image inputting means comprising a diffusion lighting device such as a ring-like light guide 4 and an image pickup device such as a CCD sensor camera 3. The diffusion lighting device 4 illuminates a wiring pattern of a printed board 1 from the upper side so that the reflected light therefrom is inputted to the image pickup device 3. Simultaneously with this illumination due to the diffusion lighting device 4, a modulated-light generating means 5 illuminates the printed board 1 from the lower side with light modulated at a predetermined period so that the light passing through the printed board 1 is also inputted to the image inputting means 2 which in turn outputs the corresponding gray level image. A bi-level conversion means 6 is responsive to the gray level image from the image inputting means 2 to perform the bi-level conversion process with respect to the gray level image. The bi-level image produced by the bi-level conversion means 6 is inputted to a hole separating means 90 which is arranged to perform a separation process between a wiring pattern and a through-hole area and further to output a hole-filling bi-level image. Although the separation methods between the wiring pattern and the through-hole area are generally classified into the method of separating them by wavelengths by using two sensors and the method of separating a through-hole area from an image data, this embodiment is based upon the method of separating the through-hole from the image data. More specifically, the illumination light to be generated from the modulated-light generating means 5 is modulated at the period of the CCD sensor camera 3 so as to cause the through-hole area to appear as a striped pattern whereby it is easily separable therefrom by the mask scanning process at a local area.

The printed board 1 is placed on a movable table, not shown, so as to be movable and the CCD sensor camera 3 is driven in synchronism with the movable table. With this operation, the gray level image to be obtained by the image pickup device 3 becomes an image in which the image signal levels are modulated at every one line in the secondary scanning direction at the through-hole area. The bi-level conversion means 6 compares the gray level image from the image inputting means 2 with a predetermined threshold so as to convert it into a bi-level image where the wiring pattern section is "1" and the base section is "0". Because of this bi-level conversion process, the through-hole area can be indicated as an image having a striped pattern where "1" and "0" are alternated with each other in the secondary scanning direction. The hole separating means 90 coupled to the bi-level conversion means 6 is arranged to extract the striped pattern of the through-hole area from the bi-level image of the bi-level conversion means 6 so as to obtain a through-hole image and further to output a hole-filling bi-level image obtained by filling the through-hole area of the original bi-level image. Illustrated at numeral 91 is an expansion means coupled to the hole separating means 90 for expanding the through-hole image by a predetermined amount, the expanding amount being controlled in accordance with the pattern width of the land portion to be detected. Further, illustrated at numeral 92 is a defect detecting means coupled to the expansion means 91 and further to the hole separating means 90 for performing the logical calculation between the through-hole image from the expansion means 90 and the hole-filling bi-level image from the hole separating means 90 so as to detect a non-coincident (non-overlapped) region. This non-coincident region is extracted as a defect at the land of the through hole.

Secondly, a detailed description will be made hereinbelow in terms of the hole separating means 90, expansion means 91 and defect detecting means 92. The image inputting means 2 and the modulated-light generating means 5 basically have the same structures as those in the first-mentioned embodiment. FIG. 14 is a block diagram showing an arrangement of the hole separating means 90. In FIG. 14, illustrated at numeral 101 is a bi-level image including a striped pattern of the through-hole area, illustrated at 102 is a edge detecting means responsive to the bi-level image 101, and illustrated at 103 is a first expansion means coupled to the edge detecting means 102. Further, numeral 104 represents a contraction means coupled to the first expansion means 103, 105 designates a second expansion means coupled to the contraction means 104, 406 depicts a delay memory directly responsive to the bi-level image, and 407 is hole-filling logical sum (OR) circuit coupled to the second expansion means 105 and the delay memory 106.

The edge detecting means 102 produces an edge image on the basis of the inputted bi-level image including the striped pattern (see FIG. 4B). The first expansion means 103 performs the expansion process to expand the edge image from the edge detecting means 102 by a predetermined size so as to smear away the through-hole area. Since in this embodiment the stripes of the striped pattern of the through hole section are formed to be arranged at an interval of one pixel, the through-hole area can be smeared away by expanding the edge image by one pixel. The contraction means 104 performs the contraction process to contract the bi-level image having the smeared striped pattern by a predetermined size so as to eliminate the edge image other than the through-hole area. Here, the edge image has a 3-pixel width because of being expanded by one pixel by the first expansion means 103, and hence, if the contraction size is above 2 pixels, the edge image other than the through-hole area can be eliminated so as to extract the through-hole image. The second expansion means 105 expands the bi-level image from the contraction means 104 by a predetermined size so as to restore the through-hole area to the original size.

A brief description will be made hereinbelow in terms of the edge detecting process, expansion process and contraction process with reference to FIGS. 15A and 15B showing scanning windows. First, the edge detection can be achieved with the 3×3 scanning window, as illustrated in FIG. 15A, in accordance with the following equation.

$$g \times y = d0(\overline{d1 \cdot d3 \cdot d5 \cdot d7})$$

On the other hand, in the case of the expansion process, the logical sum within the scanning window is calculated. For example, since the first expansion means 103 performs the expansion process by one pixel, it can be calculated in accordance with the following equation.

$$g \times y = d0 + d1 + d2 + d3 + d4 + d5 + d6 + d7 + d8$$

Further, in the case of the contraction means 104 or the second expansion means 105 for performing the image by a plurality of pixels, the logical product or the logical sum within the nxn scanning window as shown in FIG. 15B is calculated. For example, in the case of the contraction process of two pixels, the logical product of the pixels whose values are below 2 in the nxn scanning window is calculated.

The expansion means 91 in FIG. 13 is for expanding the through-hole image from the hole separating means 90 by a predetermined size whereby it is expanded by an amount corresponding to the number of pixels in the allowable range of the land width of the through hole. For example, in the case of detecting the land width below 50 microns with a resolution of 10 μm, the expansion process can be achieved by expanding the through-hole image by 4 pixels. As shown in FIG. 16, a logical calculating circuit 202 of the defect detecting means 92 is responsive to the expanded through-hole image from the expansion means 91 and further to the hole-filling bi-level image supplied from the hole separating means 90 through a delay memory 201 whereby the hole-filling bi-level image is coincident in timing with the expanded through-hole image. The defect detecting means 92 (202) calculates the logical product between the hole-filling bi-level image and the expanded through-hole image, thereby detecting the non-coincident area indicated by oblique lines in FIG. 17 to detect a defect of the land.

As described above, according to this embodiment, the through-hole area having a striped pattern due to the modulated-light generating means 5 can be separated from the image data and the expansion process is effected by pixels, which are in the allowable range of the land width, and the exclusive logical sum between the hole-filling image and the through-hole image is calculated. Thus, it is possible to easily detect the defect of the land by detecting the non-coincident area therebetween.

A description will be made hereinbelow in terms of a pattern inspecting system according to a third embodiment of the present invention. This embodiment is for accurately detecting the defect of the land portion of a through-hole even in the case that the thickness of the printed board is relative thick. In the case of a thick printed board, there is the possibility that the striped pattern of the through-hole area becomes incorrect in configuration, i.e., has a crescent configuration, because the modulated light from the modulated-light generating means is partially cut due to the deep through-hole. More specifically, for example, in the case of reading out the pattern using a one-dimensional CCD sensor camera having 5000 pixels, since the one-pixel width of the general CCD sensor camera is 7 microns, when the pattern is read out with image pickup magnification of 1:2, the pixel resolution becomes 14 microns and the width to be read by the CCD sensor camera becomes 70 microns. This seriously affects the modulated light when passing through the through-hole in the case that the thickness of the printed board is thick.

FIG. 18 is a block diagram showing an arrangement of the third embodiment where parts corresponding to those in FIG. 2 are marked with the same numerals. In FIG. 18, a diffusion lighting device 4 of an image inputting means 2 illuminates a printed board 1 from the upper side so that the reflected light from the printed board 1 is inputted to an image pickup device such as a CCD sensor camera 3 so as to produce a gray level image corresponding to the pattern on the printed board 1. Simultaneously with this illumination, a modulated-light generating means 5 also illuminates the printed board 1 with light modulated at a predetermined period (the horizontal period of the CCD sensor camera 3) so that the transmission light is inputted to the image inputting means 2. A bi-level conversion means 6 is responsive to the gray level image from the image inputting means 2 to compare the gray level image with a predetermined threshold so as to convert it into a bi-level image where the wiring pattern portion is "1" and the base portion is "0". This bi-level conversion process produces an image having a striped pattern where "1" and "0" are alternated with each other in the secondary scanning direction. An edge detecting means 7 converts the bi-level image from the bi-level conversion means 6 into an edge image (an outline image), and a first expansion means 8 expands the edge image by predetermined pixels so as to smear away the through-hole area. In this embodiment, since in the through-hole area the edge lines are arranged at an interval of one pixel, it is possible to smear away the edge image by expanding it by one pixel. A first contraction means 9 contracts the bi-level image from the first expansion means 8 by a predetermined size so as to eliminate the edge image other than the image corresponding to the through-hole area. Here, since the edge is expanded by one pixel by the first expansion means 8 so as to have 3 pixel width, if the contraction is made by 2 pixels from both sides, the edge image can be eliminated except for the through-hole area, whereby the through-hole area can be separated therefrom. The through-hole image is inputted therefrom to a second expansion means 10 so as to expand the through-hole image by a predetermined size.

Also included in the pattern inspection system of this embodiment is an inverter 111 coupled to the bi-level conversion means 6 for inverting the bi-level image so as to produce a negative image. This negative image is supplied to a third expansion means 112 which expands the negative image corresponding to the bi-level image by one pixel, thereby obtain an image accurately corresponding in configuration to the actual configuration (circular configuration) of the through-hole area. This expanded image is inputted to a second contraction means 113 so as to contract the image by a predetermined size. Further included in this embodiment is a logical product calculating means 114 which is responsive to the output image (contacted bi-level image) of the second contraction means 113 and the output image (through-hole image) of the second expansion means 10 to take the logical product of both inputted images. Due to this logical product calculating process, the negative bi-level image (wiring pattern) other than the image corresponding to the through-hole area can be eliminated, whereby the obtained through-hole image has a configuration (circle) which can reflect the central position of the land portion. Here, the expansion pixel size of the second expansion means 10, contraction pixel size of the second contraction means 113 may be determined in accordance with the size, out of roundness, eccentricity (from the center) of the through-hole image obtained by the first contraction means 9. The through-hole image obtained by the logical product calculating means 114 is supplied to a fourth expansion means 115 so as to be expanded by a predetermined size so as to restore the through-hole image to the original size. A defect detecting means 116 is responsive to the bi-level image from the bi-level conversion means 6 and further to the through-hole image from the fourth expansion means 115 so as to perform the separation process between the land portion and the conductive portion to detect defects. FIG. 19 is a graphic diagram showing the images processed by the respective means, where reference numerals respectively represents the means in FIG. 18 for processing the images.

According to this embodiment, since the through-hole image obtained by expanding and contracting the edge image and the through-hole image obtained by expanding and contracting the inverted image are logically AND-processed so as to form the through-hole image having a circular configuration, even if the thickness of the printed board is relatively thick or the image reading is performed over a wide range, it is possible to extract the through-hole area with a simple structure and to accurately inspect the width of the through-hole pattern, disconnection of the through-hole pattern and others.

A description will be made hereinbelow in terms of a pattern inspection system according to a fourth embodiment of this invention. As well as the above-described third embodiment, this embodiment is for eliminating a problem arising in the case that the thickness of the printed board is thick. FIG. 20 is a block diagram showing an arrangement of the pattern inspection system of this fourth embodiment where parts corresponding to those in FIG. 2 are marked with the same numerals. In FIG. 20, illustrated at numeral 2 is an image inputting means comprising an image pickup device 3 and a diffusion lighting means 4. The diffusion lighting means 4 illuminates a pattern on a printed board 1 from the upper side so that the reflected light therefrom is inputted to the image pickup device 3. Simultaneously with this illumination operation, a modulated-light generating means 5 illuminates the printed board 1 with light modulated at a predetermined period from the lower side so that the light passing through through-holes of the printed board 1 is inputted to the image pickup device 3. The printed board 1 is placed on a movable table, not shown, so as to be movable and the image pickup device 3 is arranged to be driven in synchronism with the drive of the movable table, whereby as illustrated in FIG. 21A an gray level image a to be outputted from the image pickup device 3 becomes a combined image of a wiring-pattern image due to the reflection illumination and a striped pattern image (corresponding to the through-hole area) due to the transmission illumination whose image signal level is modulated at every line in the secondary scanning direction.

The gray level image from the image inputting means 2 is inputted to a first amplifying means 120 to amplify the striped pattern image of the gray level image due to the transmission illumination, and then inputted to a first analog-to-digital (A/D) converter 121 so as to convert the output image of the first amplifying means 120 into a digital signal. The digital signal outputted from the first A/D converter 121 is inputted to a first bi-level conversion means 122 for the bi-level conversion process and the output of the first bi-level conversion means 122 is inputted as an image signal c1 to a through-hole separating means 126. The gray level image from the image inputting means 2 is also inputted to a second amplifying means 123 where the wiring pattern image of the gray level image due to the reflection illumination is amplified, the amplified wiring-pattern bi-level image being inputted to a second A/D converter 124 for the conversion into a digital signal, and then inputted to a second bi-level conversion means 125 for the bi-level conversion process. The output of the second bi-level conversion means 125 is also inputted as an image signal c2 to the through-hole separating means 126. The through-hole separating means 126 separates the through-hole area from the wiring pattern section and outputs a hole-filling bi-level image. Here, for allowing easy separation between the through-hole area and the wiring pattern section, the operation levels of the first and second amplifying means 120 and 123 are arranged to be extremely different from each other so that the amplification factor of the second amplifying means 123 for amplifying the wiring pattern section is arranged to effect the general linear amplification and the amplification factor of the first amplifying means 120 for amplifying the through-hole striped pattern section is arranged to effect a non-linear amplification. That is, if as illustrated in 21B the amplification factor of the first amplifying means 120 is set such that the amplification degree becomes great when the input signal level is low, the output signal b1 (see FIG. 20) of the first amplifying means 120 allows that the through-hole striped-pattern signal level is set to be high as illustrated in FIG. 21C. This makes easy the bi-level conversion process. Here, since the signal b1 from the first amplifying means 120 is used in order to extract only the through-hole area, there is no problem even if the level of the gray level signal is distorted. On the other hand, as illustrated in FIG. 21D the signal b2 (see FIG. 20) obtained by the second amplifying means 123 accurately reflects the configuration of the wiring pattern section. These viable-density signals b1 and b2 are converted tin digital signals by means of the first and second A/D converters 121 and 124 and then converted into the bi-level images through the first and second bi-level conversion means 122 and 125. In this case, since the threshold levels of the first and second bi-level conversion means 122 and 125 can independently be set as indicated by V1 and V2 in FIGS. 21C and 21D and set to adequate values, as shown in FIG. 21E the through-hole bi-level image c1 has a clear and uniform striped pattern where "1" and "0" are alternated with each other in the second scanning direction, and as shown in FIG. 21F the wiring-pattern section bi-level image c2 is also faithful. Here, even if the striped pattern slightly remains due to the threshold V2 indicated in FIG. 21D, there is no problem because the through hole section is filled in the after-process. The output of the through-hole separating means 126 is inputted through an expansion means 127 to a defect detecting means 128.

Secondly, a description will be made hereinbelow with reference to FIGS. 22 to 24 in terms of the through-hole separating means 126 and the defect detecting means 128. FIG. 22 is a block diagram showing an arrangement of the through-hole separating means 126. In FIG. 22, numeral 131 represents a through-hole bi-level image including a striped pattern, 140 designates a bi-level image indicative of the wiring pattern, 132 depicts an edge detecting means, 133 depicts a first expansion means, 134 denotes a contraction means and 135 is a second expansion means. Further, 136 is a delay memory, and 137 represents a logical sum (OR) circuit.

In response to the input of the bi-level image 131 including a striped pattern, the edge detecting means 132 converts it into an edge image. The first expansion means 133 expands the edge image from the edge detecting means 132 by a predetermined size so as to smear away the through-hole area. In this embodiment, the first expansion means 133 expands it by one pixel because the through-hole striped pattern is formed at an interval of one pixel. The contraction means 134 contracts the smeared bi-level image by a predetermined size so as to eliminate the edge image other than the image corresponding to the through-hole. Here, the contraction size is above 2 pixels because the edge image has a three-pixel width due to the expansion of one pixel due to the first expansion means 133. This contraction process allows the separation of the through-hole image. The second expansion means 135 expands the bi-level image from the contraction means 134 by a predetermined size so as to restore the through-hole image to the original size, thereby extracting a through-hole signal 138 corresponding to only the through-hole which through-hole signal is inputted to the logical sum circuit 137. On the other hand, the bi-level image 140 indicative of the wiring pattern is inputted to the logical sum circuit 137 after passed through the delay memory 136 whereby the input signal is coincident in timing with the through-hole signal 138 from the second expansion means 138. The logical sum circuit 137 calculates the logical sum of both input signals to produce a hole-filling image signal 139.

Returning back to FIG. 20, the expansion means 127 is responsive to the through-hole image 138 so as to expand the image 138 by number of pixels in the allowable range of the land width. For example, in the case of detecting the land width having a value below 50 microns with a resolution of 10 microns, the image 138 is expanded by 4 pixels. As shown in FIG. 23, the defect detecting means 128 comprises an exclusive logical sum circuit 142 and a delay memory 141 and the exclusive logical sum circuit 142 is responsive to the through-hole image outputted from the expansion means 127 and the hole-filling image 139 from the logical sum circuit 137 after passed through the delay memory 141 for the timing coincidence. The logical calculating circuit 142 calculates the exclusive logical product sum of both the input images, thereby detecting a non-coincident region therebetween (see FIG. 17).

It should be understood that the foregoing relates to only preferred embodiments of the present invention, and that it is intended to cover all changes and modifications of the embodiments of this invention herein used for the purposes of the disclosure, which do not constitute departures from the spirit and scope of the invention.

What is claimed is:

1. A pattern inspection system for inspecting a pattern of a land portion formed around a through-hole of a printed board and electrically coupled to a wiring pattern section, said printed board being arranged to be placed on a movable table so as to be movable in a predetermined direction, said system comprising:
   first illumination means for illuminating said printed board with light modulated at a predetermined period;
   image pickup means responsive to reflection light from said printed board due to said first illumination means and transmission light from said printed board due to said second illumination means to photoelectrically convert said printed board into a gray level image at least corresponding to said through-hole and said land portion;
   bi-level conversion means for comparing said gray level image from said image pickup means with a predetermined threshold so as to binary-code said gray level image to produce a bi-level image comprising a first portion indicated by "1" and a second portion indicated by "0";
   edge detecting means for detecting an edge of said bi-level image to produce an edge image comprising a boundary between said first and second portions;
   first expansion means for expanding said edge image from said edge detecting means by a predetermined size so as to produce a first expanded image where a portion corresponding to said through-hole takes the "1" state;
   contraction means for contracting said first expanded image from said first expansion means by a predetermined size to eliminate the edge image other than said through-hole section to produce a contracted image corresponding to only the through-hole;
   second expansion means for again expanding said contracted image from said contraction means by a predetermined size to produce a through-hole image having a size equal to the original size of said through-hole; and defect detecting means for inputting said through-hole image from said second expansion means and said bi-level image from said bi-level conversion means so as to detect a defect of said land portion on the basis of the inputted images, wherein said defect detecting means detects the defect of said land portion by calculating a logical product of the inputted through-hole image and the inputted bi-level image.

2. A pattern inspection system for inspecting a pattern of a land portion formed around a through-hole of a printed board and electrically coupled to a wiring pattern section, said printed board being arranged to be placed on a movable table so as to be movable in a predetermined direction, said system comprising:

first illumination means for optically illuminating said printed board;

second illumination means for illuminating said printed board with light modulated at a predetermined period;

image pickup means responsive to reflection light from said printed board due to said first illumination means and transmission light from said printed board due to said second illumination means to photoelectrically convert said printed board into a gray level image at least corresponding to said through-hole and said land portion;

bi-level conversion means for comparing said gray level image from said image pickup means with a predetermined threshold so as to binary-code said gray level image to produce a bi-level image comprising a first portion indicated by "1" and a second portion indicated by "0";

separating means for separating a portion indicative of said through-hole from said bi-level image produced by said bi-level conversion means to produce a through-hole image and for filling the through-hole portion of said bi-level image to produce a through-hole-filled image;

expansion means for expanding the separated through-hole image from said separating means by a predetermined size; and defect detecting means responsive to said through-hole-filled image from said separating means and said expanded through-hole image from said expansion means to perform a logical calculation of both the inputted images to detect a defect of said land portion.

3. A pattern inspection system for inspecting a pattern of a land portion formed around a through-hole of a printed board and electrically coupled to a wiring pattern section, said printed board being arranged to be placed on a movable table so as to be movable in a predetermined direction, said system comprising:

first illumination means for optically illuminating said printed board;

second illumination means for illuminating said printed board with light modulated at a predetermined period;

image pickup means responsive to reflection light from said printed board due to said first illumination means and transmission light from said printed board due to said second illumination means to photoelectrically convert said printed board into a gray level image at least corresponding to said through-hole and said land portion;

bi-level conversion means for comparing said gray level image from said image pickup means with a predetermined threshold so as to binary-code said gray level image to produce a bi-level image comprising a first portion indicated by "1" and a second portion indicated by "0";

edge detecting means for detecting an edge of said bi-level image to produce an edge image comprising a boundary between said first and second portions;

first expansion means for expanding said edge image from said edge detecting means by a predetermined size so as to produce a first expanded image where a portion corresponding to said through-hole takes the "1" state;

first contraction means for contracting said first expanded image from said first expansion means by a predetermined size to eliminate the edge image other than said through-hole section to produce a contracted image corresponding to only the through-hole;

second expansion means for again expanding said contracted image from said contraction means by a predetermined size to produce a second expanded image;

inversion means coupled to said bi-level conversion means for inverting said bi-level image;

third expansion means for expanding said inverted bi-level image by a predetermined size so as to produce a third expanded image;

second contraction means for contracting said third expanded image from said third expansion means; and logical product calculating means for inputting said contracted image from said second contraction means and said second expanded image from said second expansion means for performing a logical produce between both the inputted images so as to extract a through-hole image;

fourth expansion means for expanding said through-hole image from said logical product means so that said through-hole image has a size equal to the original size of said through-hole; and defect detecting means for inputting the expanded through-hole image from said fourth expansion means and said bi-level image from said bi-level image for detecting a defect of a land portion of said through-hole on the basis of both inputted images.

4. A pattern inspection system for inspecting a pattern of a land portion formed around a through-hole of a printed board and electrically coupled to a wiring pattern section, said printed board being arranged to be placed on a movable table so as to be movable in a predetermined direction, said system comprising:

first illumination means for optically illuminating said printed board;

second illumination means for illuminating said printed board with light modulated at a predetermined period;

image pickup means responsive to reflection light from said printed board due to said first illumination means and transmission light from said printed board due to said second illumination means to photoelectrically convert said printed board into a gray level image at least corresponding to said through-hole and said land portion;

bi-level conversion means for comparing said gray level image from said image pickup means with a predetermined threshold so as to binary-code said gray level image to produce a bi-level image comprising a first portion indicated by "1" and a second portion indicated by "0";

first and second amplifying means for respectively amplifying first and second portions of said gray level image from said image pickup means, said first portion corresponding to the reflection light image and said second portion corresponding to the transmission light image;

first and second analog-to-digital converting means for respectively converting the amplified reflection light image and the amplified transmission light image;

first and second bi-level conversion means for respectively bi-level converting the digital reflection light image and the digital transmission image;

separating means responsive to both the bi-level reflection light image and bi-level transmission light image for separating an image corresponding to said through-hole to produce a through-hole image and for filling the through-hole portion of said bi-level image to produce a through-hole-filled image;

expansion means for expanding the through-hole image from said separating means; and defect detecting means for inputting the expanded through-hole image from said expansion means and the filled through-hole image from said separating means to detect a defect of a land portion of said through-hole on the basis of both the inputted images.

* * * * *